(12) United States Patent
Arndt et al.

(10) Patent No.: US 7,966,616 B2
(45) Date of Patent: Jun. 21, 2011

(54) ASSOCIATION OF MEMORY ACCESS THROUGH PROTECTION ATTRIBUTES THAT ARE ASSOCIATED TO AN ACCESS CONTROL LEVEL ON A PCI ADAPTER THAT SUPPORTS VIRTUALIZATION

(75) Inventors: Richard Louis Arndt, Austin, TX (US); Giora Biran, Zichron-Yaakov (IL); Harvey Gene Kiel, Rochester, MN (US); Vadim Makhervaks, Austin, TX (US); Renato John Recio, Austin, TX (US); Leah Shalev, Zichron-Yaakov (IL); Jaya Srikrishnan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 12/054,578

(22) Filed: Mar. 25, 2008

(65) Prior Publication Data

US 2008/0168461 A1 Jul. 10, 2008

Related U.S. Application Data

(63) Continuation of application No. 11/066,419, filed on Feb. 25, 2005, now abandoned.

(51) Int. Cl.
*G06F 9/46* (2006.01)
*G06F 3/00* (2006.01)
*H04L 12/28* (2006.01)
*H04L 12/56* (2006.01)

(52) U.S. Cl. ............ 718/104; 718/100; 710/1; 370/400; 370/409

(58) Field of Classification Search .................. 711/173; 370/409, 400; 710/1, 3, 8, 9, 28, 36; 718/100, 718/102, 104
See application file for complete search history.

(56) References Cited

U.S. PATENT DOCUMENTS 5,668,943 A 9/1997 Attanasio et al.
(Continued)

FOREIGN PATENT DOCUMENTS

EP 1508855 A2 8/2004

OTHER PUBLICATIONS

"Virtual Interface Architecture Specification", Version 1.0, Dec. 1997, pp. 11-12, 20-22, 55-57, 64-66, retrieved Apr. 19, 2006. http://rimonbarr.com/repository/cs614/san_10.pdf.

(Continued)

*Primary Examiner* — Meng-Ai An
*Assistant Examiner* — Caroline Arcos
(74) *Attorney, Agent, or Firm* — Yee & Associates, P.C.; Matthew W. Baca

(57) ABSTRACT

A method, system, and computer program product for sharing adapter resources among multiple operating system instances. The present invention provides a mechanism for dynamically allocating virtualized I/O adapter resources. The present invention separates the operation of adapter resource allocation from adapter resource management. Protection attributes within the adapter resource context are used to allow the adapter to enforce access control over the adapter resources. The hypervisor allocates an available adapter resource to a given partition. The adapter is notified of the allocation, and the adapter updates its internal structure to reflect the allocation. The hypervisor may revoke ownership of and reassign adapter resources to another OS instance. In this manner, the allocation described above allows for the simple reassignment of resources from one partition to another.

20 Claims, 13 Drawing Sheets

U.S. PATENT DOCUMENTS

| | | | |
|---|---|---|---|
| 6,111,894 A | 8/2000 | Bender et al. | |
| 6,134,641 A | 10/2000 | Anand | |
| 6,199,137 B1 | 3/2001 | Aguilar et al. | |
| 6,212,585 B1 | 4/2001 | Chrabaszcz | |
| 6,370,656 B1 | 4/2002 | Olarig et al. | |
| 6,453,392 B1 | 9/2002 | Flynn, Jr. | |
| 6,487,680 B1 | 11/2002 | Skazinski et al. | |
| 6,598,144 B1 | 7/2003 | Bailey et al. | |
| 6,629,157 B1 | 9/2003 | Falardeau et al. | |
| 6,629,162 B1 * | 9/2003 | Arndt et al. | 710/28 |
| 6,662,289 B1 | 12/2003 | Ang | |
| 6,704,284 B1 | 3/2004 | Stevenson et al. | |
| 6,804,741 B2 | 10/2004 | Cowan | |
| 6,823,418 B2 | 11/2004 | Langendorf et al. | |
| 7,003,586 B1 | 2/2006 | Bailey et al. | |
| 7,130,982 B2 * | 10/2006 | Boutcher et al. | 711/173 |
| 7,200,687 B2 * | 4/2007 | Nordstrom et al. | 710/9 |
| 7,356,818 B2 * | 4/2008 | Carollo et al. | 718/102 |
| 7,480,742 B2 * | 1/2009 | Arndt et al. | 710/8 |
| 2002/0069335 A1 | 6/2002 | Flynn, Jr. | |
| 2002/0085493 A1 | 7/2002 | Pekkala et al. | |
| 2002/0112102 A1 | 8/2002 | Tarui et al. | |
| 2002/0129212 A1 | 9/2002 | Lee et al. | |
| 2003/0061379 A1 | 3/2003 | Craddock et al. | |
| 2003/0204648 A1 * | 10/2003 | Arndt | 710/5 |
| 2003/0236852 A1 | 12/2003 | Fernandes et al. | |
| 2004/0202189 A1 | 10/2004 | Arndt et al. | |
| 2004/0205253 A1 * | 10/2004 | Arndt et al. | 710/1 |
| 2004/0215915 A1 * | 10/2004 | Block et al. | 711/173 |
| 2005/0039180 A1 * | 2/2005 | Fultheim et al. | 718/1 |
| 2005/0076157 A1 | 4/2005 | Serizawa et al. | |
| 2005/0091365 A1 | 4/2005 | Lowell et al. | |
| 2005/0102682 A1 | 5/2005 | Shah et al. | |
| 2005/0119996 A1 | 6/2005 | Ohata et al. | |
| 2005/0120160 A1 | 6/2005 | Plouffe et al. | |
| 2005/0182788 A1 | 8/2005 | Arndt et al. | |
| 2005/0228861 A1 | 10/2005 | Arndt et al. | |
| 2005/0240932 A1 | 10/2005 | Billau et al. | |
| 2005/0246450 A1 | 11/2005 | Enko et al. | |
| 2006/0044301 A1 | 3/2006 | Ha | |
| 2006/0069828 A1 | 3/2006 | Goldsmith | |
| 2006/0095690 A1 | 5/2006 | Craddock et al. | |
| 2006/0112376 A1 | 5/2006 | Broberg et al. | |
| 2006/0184349 A1 | 8/2006 | Goud et al. | |
| 2006/0193327 A1 | 8/2006 | Arndt et al. | |
| 2006/0195617 A1 | 8/2006 | Arndt et al. | |
| 2006/0195619 A1 | 8/2006 | Arndt et al. | |
| 2006/0195620 A1 | 8/2006 | Arndt et al. | |
| 2006/0195623 A1 | 8/2006 | Arndt et al. | |
| 2006/0195626 A1 | 8/2006 | Arndt et al. | |
| 2006/0195634 A1 | 8/2006 | Arndt et al. | |
| 2006/0195642 A1 | 8/2006 | Arndt et al. | |
| 2006/0195644 A1 | 8/2006 | Arndt et al. | |
| 2006/0195663 A1 | 8/2006 | Arndt et al. | |
| 2006/0195673 A1 | 8/2006 | Arndt et al. | |
| 2006/0195674 A1 | 8/2006 | Arndt et al. | |
| 2006/0195675 A1 | 8/2006 | Arndt et al. | |
| 2006/0195848 A1 | 8/2006 | Arndt et al. | |
| 2006/0209724 A1 | 9/2006 | Arndt et al. | |
| 2006/0209863 A1 | 9/2006 | Arndt et al. | |
| 2006/0212606 A1 | 9/2006 | Arndt et al. | |
| 2006/0212608 A1 | 9/2006 | Arndt et al. | |
| 2006/0212620 A1 | 9/2006 | Arndt et al. | |
| 2006/0224790 A1 | 10/2006 | Arndt et al. | |
| 2006/0239287 A1 | 10/2006 | Johnsen et al. | |
| 2006/0242330 A1 | 10/2006 | Torudbakken et al. | |
| 2006/0242332 A1 | 10/2006 | Johnsen et al. | |
| 2006/0242333 A1 | 10/2006 | Johnsen et al. | |
| 2006/0242352 A1 | 10/2006 | Torudbakken et al. | |
| 2006/0242354 A1 | 10/2006 | Johnsen et al. | |
| 2006/0253619 A1 | 11/2006 | Torudbakken et al. | |

OTHER PUBLICATIONS

USPTO office action for U.S. Appl. No. 12/139,063 dated Oct. 22, 2010.

USPTO office action for U.S. Appl. No. 11/066,419 dated Aug. 20, 2010.

USPTO office action for U.S. Appl. No. 12/059,870 dated Sep. 2, 2010.

USPTO office action for U.S. Appl. No. 12/059,870 dated Mar. 25, 2010.

USPTO office action for U.S. Appl. No. 12/059,870 dated Jan. 20, 2011.

USPTO Notice of allowance for U.S. Appl. No. 12/139,063 dated Jan. 3, 2011.

* cited by examiner

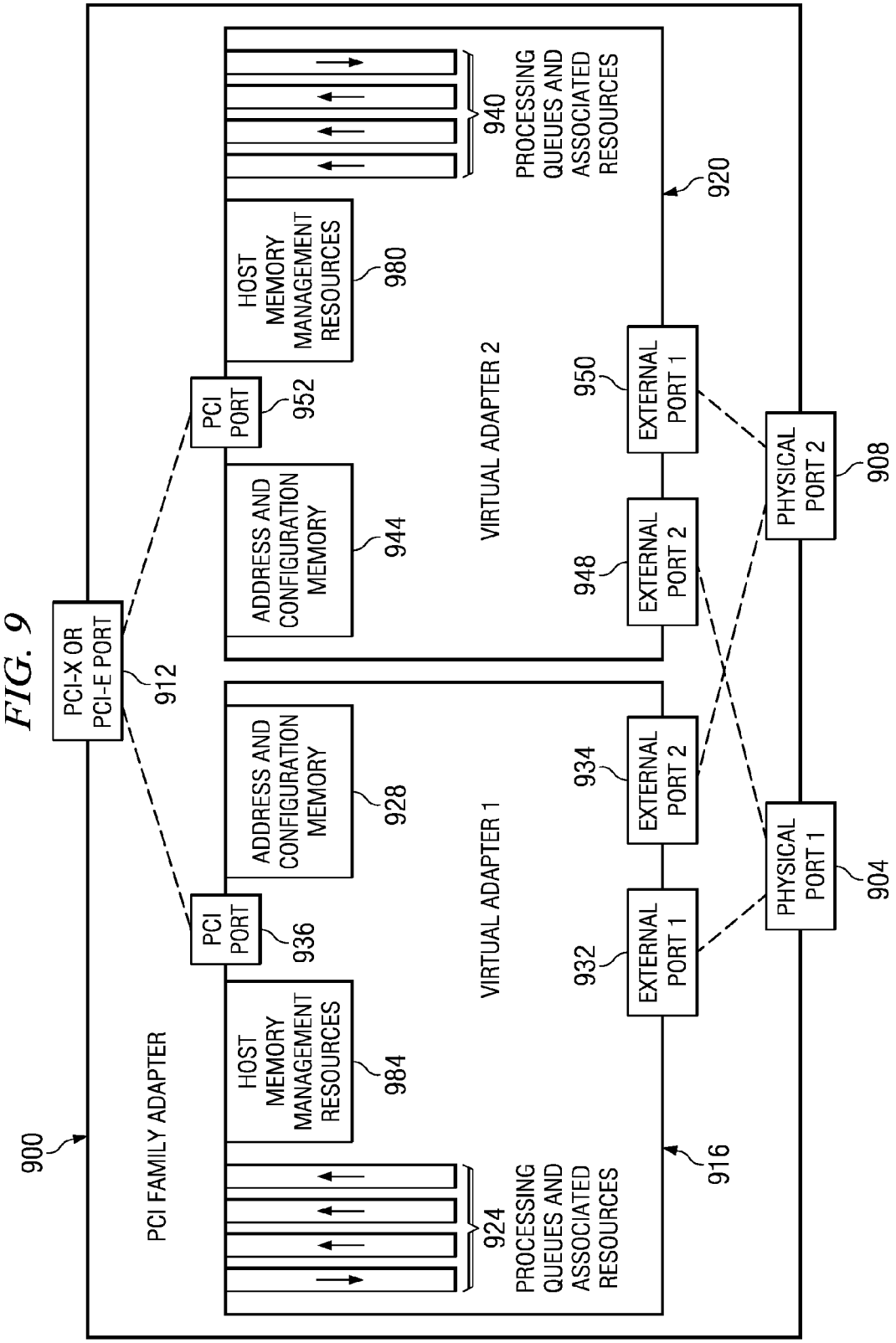

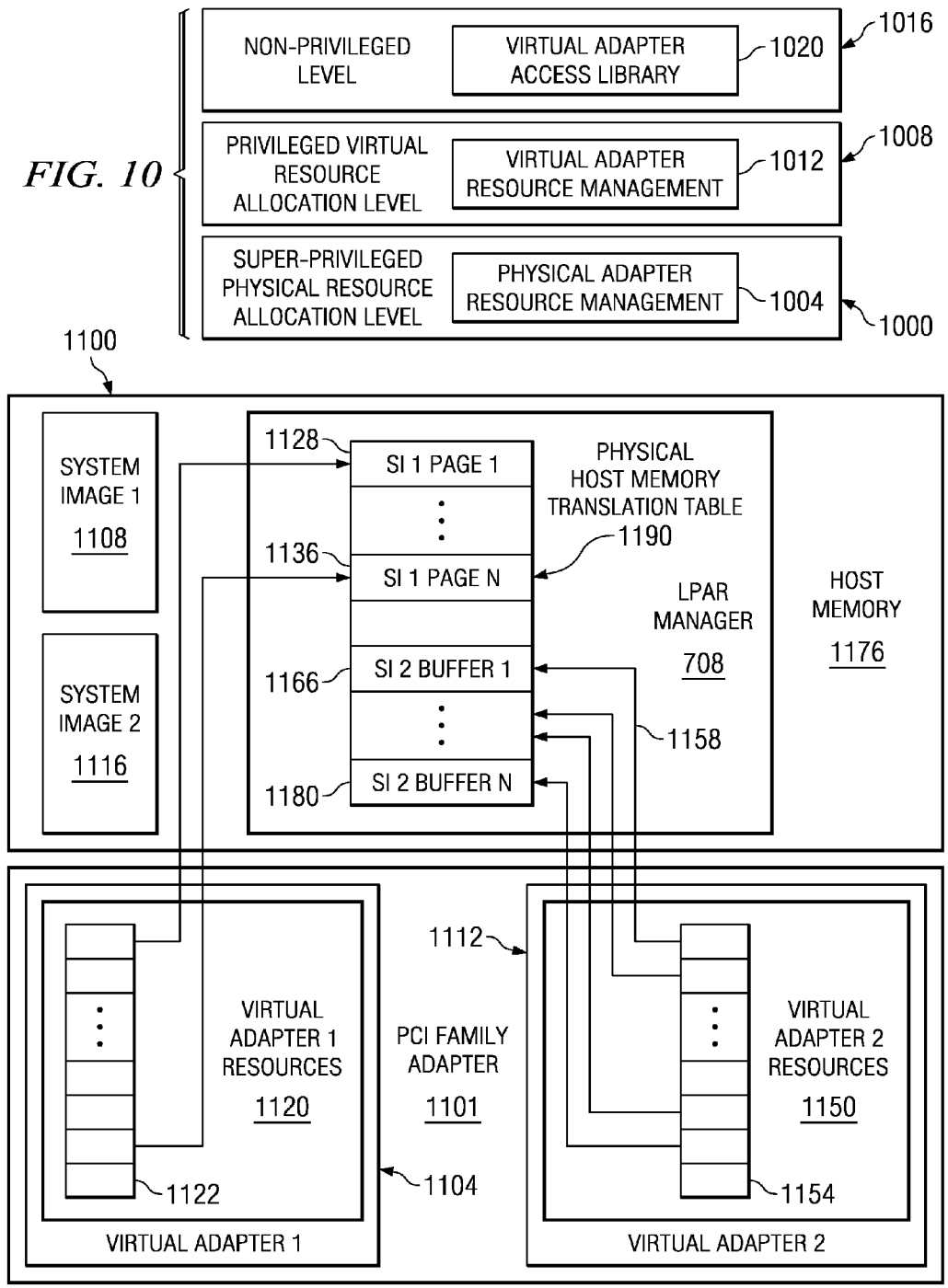

ASSOCIATION OF MEMORY ACCESS THROUGH PROTECTION ATTRIBUTES THAT ARE ASSOCIATED TO AN ACCESS CONTROL LEVEL ON A PCI ADAPTER THAT SUPPORTS VIRTUALIZATION

CROSS-REFERENCE TO RELATED APPLICATIONS

This application is related to commonly assigned and U.S. Pat. No. 7,493,425 entitled "Method, System and Program Product for Differentiating Between Virtual Hosts on Bus Transactions and Associating Allowable Memory Access for an Input/Output Adapter that Supports Virtualization"; U.S. patent application Ser. No. 11/066,645 entitled "Virtualized I/O Adapter for a Multi-Processor Data Processing System" now abandoned; U.S. Pat. No. 7,685,335 entitled "Virtualized Fibre Channel Adapter for a Multi-Processor Data Processing System"; U.S. Pat. No. 7,260,664 entitled "Interrupt Mechanism on an IO Adapter That Supports Virtualization"; U.S. Pat. No. 7,870,301 entitled "System and Method for Modification of Virtual Adapter Resources in a Logically Partitioned Data Processing System"; U.S. Pat. No. 7,480,742 entitled "Method, System, and Computer Program Product for Virtual Adapter Destruction on a Physical Adapter that Supports Virtual Adapters"; U.S. patent application Ser. No. 11/066,518 entitled "System and Method of Virtual Resource Modification on a Physical Adapter that Supports Virtual Resources", now abandoned; U.S. Pat. No. 7,543,084 entitled "Method for Destroying Virtual Resources in a Logically Partitioned Data Processing System"; U.S. Pat. No. 7,398,337 entitled "Association of Host Translations that are Associated to an Access Control Level on a PCI Bridge that Supports Virtualization"; U.S. Pat. No. 7,483,679 entitled "Method, Apparatus, and Computer Program Product for Coordinating Error Reporting and Reset Utilizing an I/O Adapter that Supports Virtualization"; U.S. Pat. No. 7,475,166 entitled "Method and System for Fully Trusted Adapter Validation of Addresses Referenced in a Virtual Host Transfer Request"; U.S. Pat. No. 7,386,637 entitled "System, Method, and Computer Program Product for a Fully Trusted Adapter Validation of Incoming Memory Mapped I/O Operations on a Physical Adapter that Supports Virtual Adapters or Virtual Resources"; U.S. Pat. No. 7,464,191 entitled "System and Method for Host Initialization for an Adapter that Supports Virtualization"; U.S. patent application Ser. No. 11/065,829 entitled "Data Processing System, Method, and Computer Program Product for Creation and Initialization of a Virtual Adapter on a Physical Adapter that Supports Virtual Adapter Level Virtualization", now abandoned; U.S. Pat. No. 7,546,386 entitled "System and Method for Virtual Resource Initialization on a Physical Adapter that Supports Virtual Resources"; U.S. patent application Ser. No. 11/065,821 entitled "Method and System for Native Virtualization on a Partially Trusted Adapter Using Adapter Bus, Device and Function Number for Identification", now abandoned; U.S. patent application Ser. No. 11/066,487 entitled "Native Virtualization on a Partially Trusted Adapter Using PCI Host Memory Mapped Input/Output Memory Address for Identification", now on appeal; U.S. Pat. No. 7,398,328 entitled "Native Virtualization on a Partially Trusted Adapter Using PCI Host Bus, Device, and Function Number for Identification; U.S. Pat. No. 7,376,770 entitled "System and Method for Virtual Adapter Resource Allocation"; U.S. patent application Ser. No. 11/067,354 entitled "System and Method for Providing Quality of Service in a Virtual Adapter", now abandoned; and U.S. Pat. No. 7,308,551 entitled "System and Method for Managing Metrics Table Per Virtual Port in a Logically Partitioned Data Processing System" all of which are hereby incorporated by reference.

This application is a continuation of application Ser. No. 11/066,419, filed Feb. 25, 2005, status pending.

BACKGROUND OF THE INVENTION

1. Technical Field

The present invention relates generally to communication protocols between a host computer and an input/output (I/O) adapter. More specifically, the present invention provides an implementation for virtualizing resources in a physical I/O adapter. In particular, the present invention provides a method, apparatus, and computer instructions for efficient and flexible sharing of adapter resources among multiple operating system instances.

2. Description of Related Art

A partitioned server is one in which platform firmware, such as a hypervisor, manages multiple partitions (one operating system (OS) instance in each partition) and each partition has allocated resources: processor (processors or portion of a processor), memory, and I/O adapters. An example of platform firmware used in logical partitioned data processing systems is a hypervisor, which is available from International Business Machines Corporation. The hypervisor mediates data movement between partitions to insure that the only data approved by their respective owning partitions are involved.

Existing partitioned servers typically have three access control levels:

(1) Hypervisor level—This level is used to subdivide physical server resources (processor, memory and I/O) into one or more shared resource groups that are allocated to an operating system (OS) instance. This level is referred to as privileged, because it is the only level that can perform physical resource allocation.

(2) OS level—Each OS instance created by the hypervisor executes at this level. An OS instance may only access resources that have been allocated to the OS instance at the hypervisor level. Each OS instance is isolated from other OS instances through hardware and the resource allocations performed at the hypervisor level. The resources allocated to a single OS instance can be further subdivided into one or more shared resource groups that are allocated to an application instance.

(3) Application level—Each application instance created by the OS executes at this level. An application instance can only access resources that have been allocated to the application instance at the OS level. Each application instance is isolated from other application instances through hardware and the resource allocations performed at the OS level.

A problem encountered with using I/O adapters in virtualized systems is an inability of the I/O adapter to share its resources. Currently, I/O adapters provide a single bus space for all memory mapped I/O operations. Currently available I/O adapters do not have a mechanism to configure multiple address spaces per adapter, where (1) each address space is associated to particular access level (hypervisor, OS, and application, respectively); and (2) the I/O adapter in conjunction with virtual memory manager (VMM) provides access isolation between the various OS instances that share the I/O adapter, on different access levels.

Without a direct mechanism for sharing I/O adapters, OS instances do not share an I/O adapter, or, alternatively, they share an I/O adapter by going through an intermediary, such as a hosting partition, hypervisor, or special I/O processor. The inability to share an I/O adapter between OS instances presents several problems, including requiring more I/O slots and adapters per physical server, and high performance I/O adapters may not be fully utilized by a single OS instance. Sharing an I/O adapter through a hosting partition or hypervisor also presents several problems, the most significant being the additional latency added to every I/O operation by going through the intermediary. If the intermediary is in the host (e.g., hosting partition or hypervisor), then the sharing function takes CPU cycles away from the application for each I/O operation. If the intermediary is outboard (e.g., I/O processor), then the sharing function requires an additional card, thus adding cost to the total server solution.

Therefore, it would be advantageous to have a mechanism for the direct sharing of adapter resources among multiple OS instances while the adapter enforces access level validation to the adapter resources.

SUMMARY OF THE INVENTION

The present invention provides a method, system, and computer program product for efficient and flexible sharing of adapter resources among multiple operating system instances. Specifically, the present invention provides a mechanism for dynamically allocating virtualized I/O adapter resources, without adding complexity to the adapter implementation. A hypervisor is used to locate available resources in an adapter and allocates an available adapter resource to a given partition. The adapter is notified of the allocation, and the adapter internal structure is updated to reflect the allocation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a diagram illustrating the key elements of the parallel Peripheral Computer Interface (PCI) bus protocol in accordance with a preferred embodiment of the present;

FIG. 9 is a diagram illustrating the adapter resources that are virtualized in order to allow: an adapter to directly access virtual host resources; allow a virtual host to directly access adapter resources; and allow a non-PCI port on the adapter to access resources on the adapter or host in accordance with a preferred embodiment of the present invention;

FIG. 10 is a diagram illustrating the creation of the three access control levels used to manage a PCI family adapter that supports I/O virtualization in accordance with a preferred embodiment of the present invention;

FIG. 11 is a diagram illustrating how host memory that is associated with a system image is made available to a virtual adapter that is associated with a system image through an LPAR manager in accordance with a preferred embodiment of the present invention;

DETAILED DESCRIPTION OF THE PREFERRED EMBODIMENT

The present invention applies to any general or special purpose host that uses PCI family I/O adapter to directly attach storage or to attach to a network, where the network consists of endnodes, switches, router and the links interconnecting these components. The network links can be Fibre Channel, Ethernet, InfiniBand, Advanced Switching Interconnect, or a proprietary link that uses proprietary or standard protocols.

Figure 1:
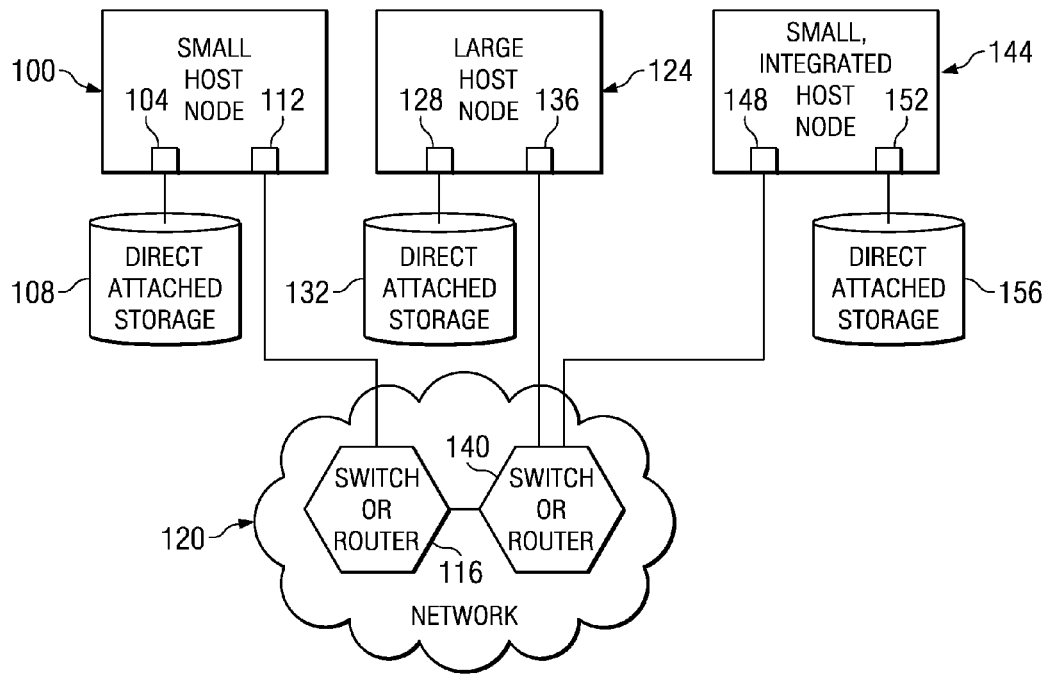
FIG. 1 is a diagram of a distributed computer system illustrated in accordance with a preferred embodiment of the present invention.

With reference now to the figures and in particular with reference to FIG. 1, a diagram of a distributed computer system is illustrated in accordance with a preferred embodiment of the present invention. The distributed computer system represented in FIG. 1 takes the form of a network, such as network 120, and is provided merely for illustrative purposes and the embodiments of the present invention described below can be implemented on computer systems of numerous other types and configurations. Two switches (or routers) are shown inside of network 120—switch 116 and switch 140. Switch 116 connects to small host node 100 through port 112. Small host node 100 also contains a second type of port 104 which connects to a direct attached storage subsystem, such as direct attached storage 108.

Network 120 can also attach large host node 124 through port 136 which attaches to switch 140. Large host node 124 can also contain a second type of port 128, which connects to a direct attached storage subsystem, such as direct attached storage 132.

Network 120 can also attach a small integrated host node 144 which is connected to network 120 through port 148 which attaches to switch 140. Small integrated host node 144 can also contain a second type of port 152 which connects to a direct attached storage subsystem, such as direct attached storage 156.

Figure 2:
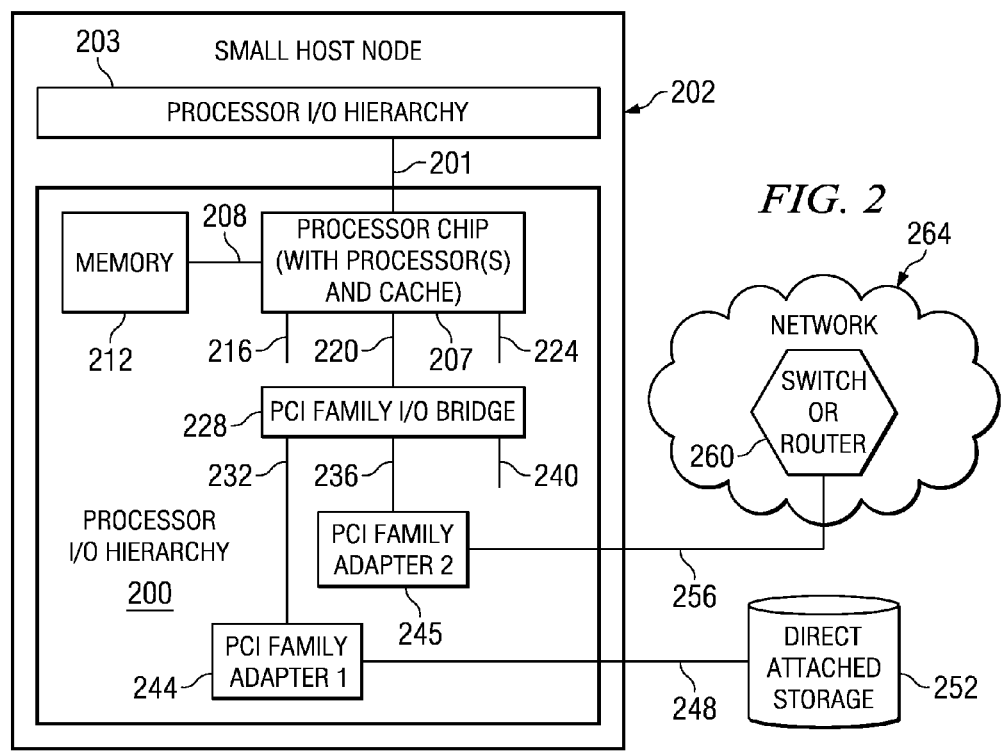
FIG. 2 is a functional block diagram of a small host processor node in accordance with a preferred embodiment of the present invention.

Turning next to FIG. 2, a functional block diagram of a small host node is depicted in accordance with a preferred embodiment of the present invention. Small host node 202 is an example of a host processor node, such as small host node 100 shown in FIG. 1.

In this example, small host node 202 includes two processor I/O hierarchies, such as processor I/O hierarchy 200 and 203, which are interconnected through link 201. In the illustrative example of FIG. 2, processor I/O hierarchy 200 includes processor chip 207 which includes one or more processors and their associated caches. Processor chip 207 is connected to memory 212 through link 208. One of the links on processor chip, such as link 220, connects to PCI family I/O bridge 228. PCI family I/O bridge 228 has one or more PCI family (e.g., PCI, PCI-X, PCI-Express, or any future generation of PCI) links that is used to connect other PCI family I/O bridges or a PCI family I/O adapter, such as PCI family adapter 244 and PCI family adapter 245, through a PCI link, such as link 232, 236, and 240. PCI family adapter 245 can also be used to connect a network, such as network 264, through a link via either a switch or router, such as switch or router 260. PCI family adapter 244 can be used to connect direct attached storage, such as direct attached storage 252, through link 248. Processor I/O hierarchy 203 may be configured in a manner similar to that shown and described with reference to processor I/O hierarchy 200.

Figure 3:
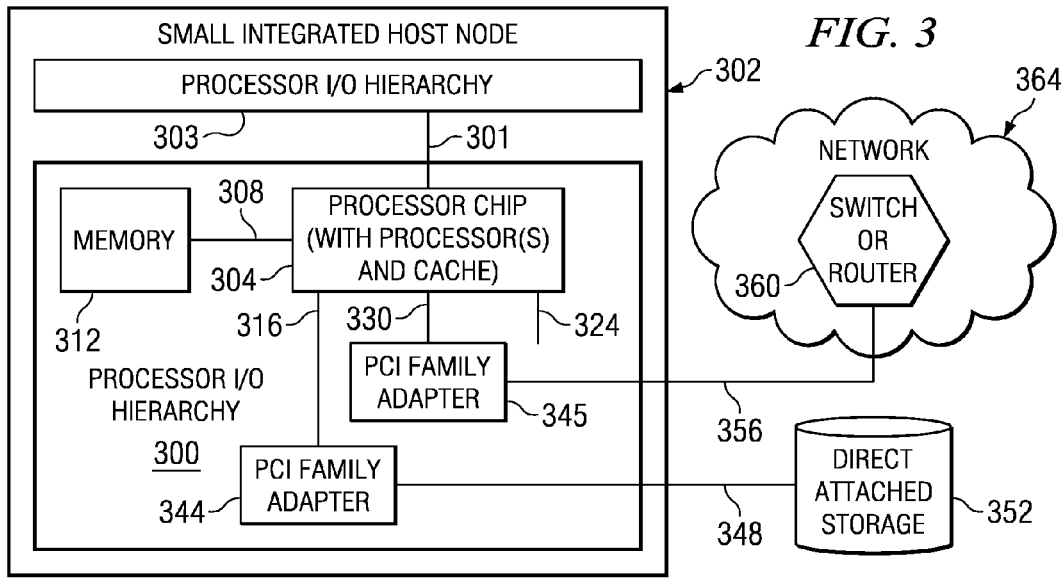
FIG. 3 is a functional block diagram of a small, integrated host processor node in accordance with a preferred embodiment of the present invention.

With reference now to FIG. 3, a functional block diagram of a small integrated host node is depicted in accordance with a preferred embodiment of the present invention. Small integrated host node 302 is an example of a host processor node, such as small integrated host node 144 shown in FIG. 1.

In this example, small integrated host node 302 includes two processor I/O hierarchies 300 and 303, which are interconnected through link 301. In the illustrative example, processor I/O hierarchy 300 includes processor chip 304, which is representative of one or more processors and associated caches. Processor chip 304 is connected to memory 312 through link 308. One of the links on the processor chip, such as link 330, connects to a PCI family adapter, such as PCI family adapter 345. Processor chip 304 has one or more PCI family (e.g., PCI, PCI-X, PCI-Express, or any future generation of PCI) links that is used to connect either PCI family I/O bridges or a PCI family I/O adapter, such as PCI family adapter 344 and PCI family adapter 345 through a PCI link, such as link 316, 330, and 324. PCI family adapter 345 can also be used to connect with a network, such as network 364, through link 356 via either a switch or router, such as switch or router 360. PCI family adapter 344 can be used to connect with direct attached storage 352 through link 348.

Figure 4:
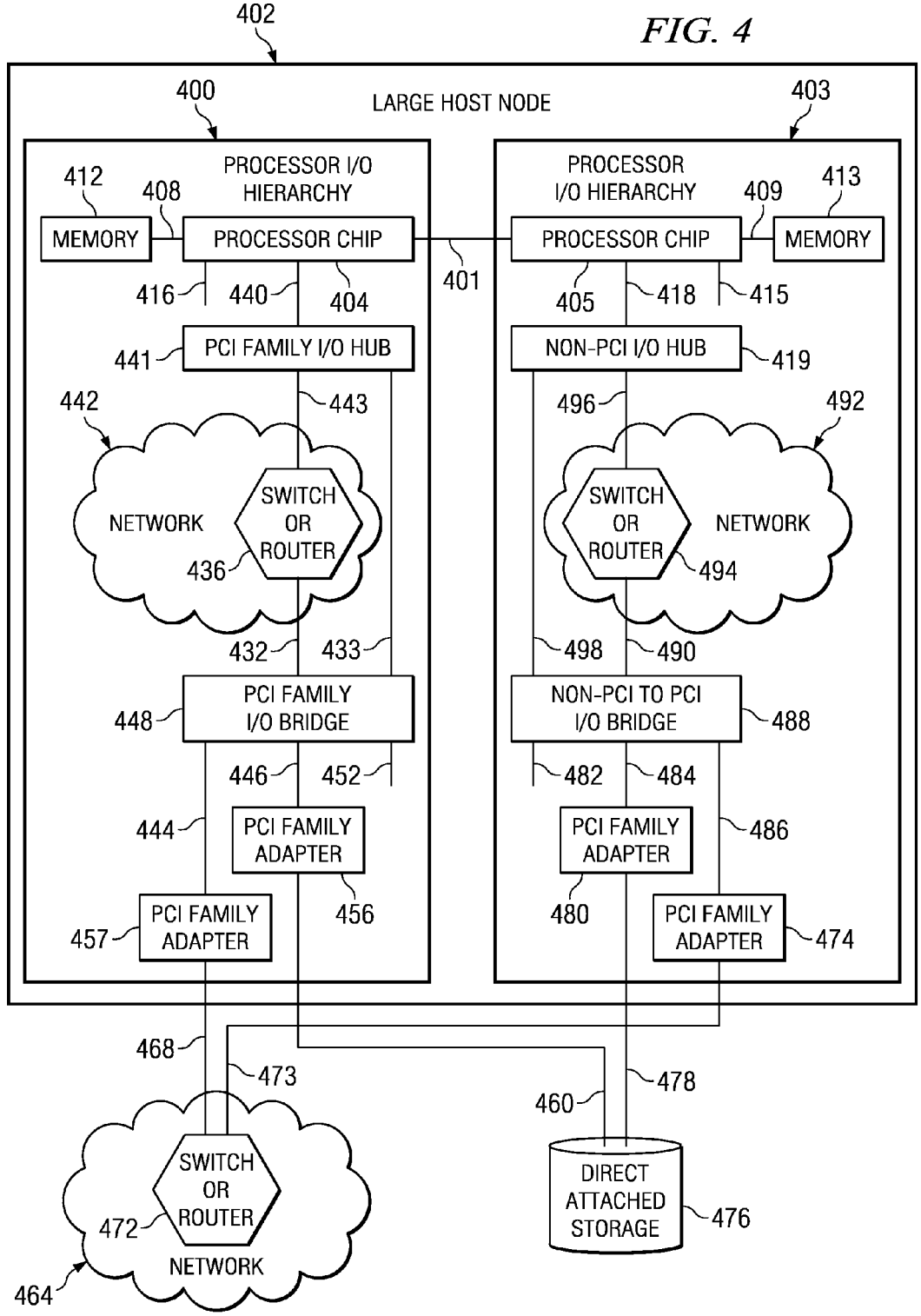
FIG. 4 is a functional block diagram of a large host processor node in accordance with a preferred embodiment of the present invention.

Turning now to FIG. 4, a functional block diagram of a large host node is depicted in accordance with a preferred embodiment of the present invention. Large host node 402 is an example of a host processor node, such as large host node 124 shown in FIG. 1.

In this example, large host node 402 includes two processor I/O hierarchies 400 and 403 interconnected through link 401. In the illustrative example of FIG. 4, processor I/O hierarchy 400 includes processor chip 404, which is representative of one or more processors and associated caches. Processor chip 404 is connected to memory 412 through link 408. One of the links, such as link 440, on the processor chip connects to a PCI family I/O hub, such as PCI family I/O hub 441. The PCI family I/O hub uses a network 442 to attach to a PCI family I/O bridge 448. That is, PCI family I/O bridge 448 is connected to switch or router 436 through link 432 and switch or router 436 also attaches to PCI family I/O hub 441 through link 443. Network 442 allows the PCI family I/O hub and PCI family I/O bridge to be placed in different packages. PCI family I/O bridge 448 has one or more PCI family (e.g., PCI, PCI-X, PCI-Express, or any future generation of PCI) links that is used to connect with other PCI family I/O bridges or a PCI family I/O adapter, such as PCI family adapter 456 and PCI family adapter 457 through a PCI link, such as link 444, 446, and 452. PCI family adapter 456 can be used to connect direct attached storage 476 through link 460. PCI family adapter 457 can also be used to connect with network 464 through link 468 via, for example, either a switch or router 472.

Turning next to FIG. 5, illustrations of the phases contained in a PCI bus transaction 500 and a PCI-X bus transaction 520 are depicted in accordance with a preferred embodiment of the present invention. PCI bus transaction 500 depicts a conventional PCI bus transaction that forms the unit of information which is transferred through a PCI fabric for conventional PCI. PCI-X bus transaction 520 depicts the PCI-X bus transaction that forms the unit of information which is transferred through a PCI fabric for PCI-X.

PCI bus transaction 500 shows three phases: an address phase 508; a data phase 512; and a turnaround cycle 516. Also depicted is the arbitration for next transfer 504, which can occur simultaneously with the address, data, and turnaround cycle phases. For PCI, the address contained in the address phase is used to route a bus transaction from the adapter to the host and from the host to the adapter.

PCI-X transaction 520 shows five phases: an address phase 528; an attribute phase 532; a response phase 560; a data phase 564; and a turnaround cycle 566. Also depicted is the arbitration for next transfer 524 which can occur simultaneously with the address, attribute, response, data, and turnaround cycle phases. Similar to conventional PCI, PCI-X uses the address contained in the address phase to route a bus transaction from the adapter to the host and from the host to the adapter. However, PCI-X adds the attribute phase 532 which contains three fields that define the bus transaction requester, namely: requester bus number 544, requester device number 548, and requester function number 552 (collectively referred to herein as a BDF). The bus transaction also contains a tag 540 that uniquely identifies the specific bus transaction in relation to other bus transactions that are outstanding between the requester and a responder. The byte count 556 contains a count of the number of bytes being sent.

Figure 6:
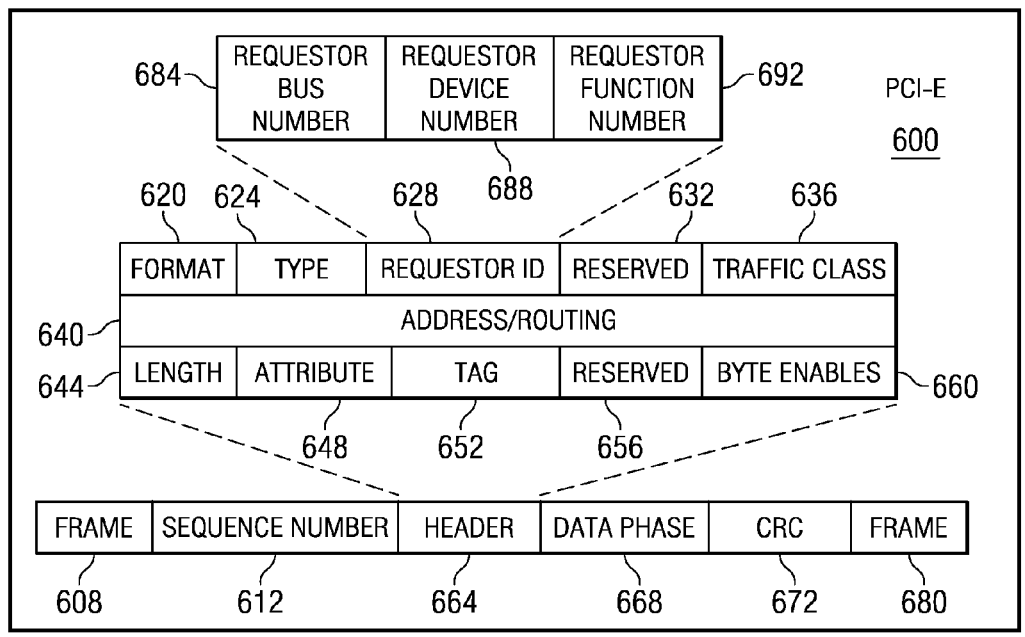
FIG. 6 is a diagram illustrating the key elements of the serial PCI bus protocol in accordance with a preferred embodiment of the present.

Turning now to FIG. 6, an illustration of the phases contained in a PCI-Express bus transaction is depicted in accordance with a preferred embodiment of the present invention. PCI-E bus transaction 600 forms the unit of information which is transferred through a PCI fabric for PCI-E.

PCI-E bus transaction 600 shows six phases: frame phase 608; sequence number 612; header 664; data phase 668; cyclical redundancy check (CRC) 672; and frame phase 680. PCI-E header 664 contains a set of fields defined in the PCI-Express specification. The requester identifier (ID) field 628 contains three fields that define the bus transaction requester, namely: requester bus number 684, requester device number 688, and requester function number 692. The PCI-E header also contains tag 652, which uniquely identifies the specific bus transaction in relation to other bus transactions that are outstanding between the requester and a responder. The length field 644 contains a count of the number of bytes being sent.

Figure 7:
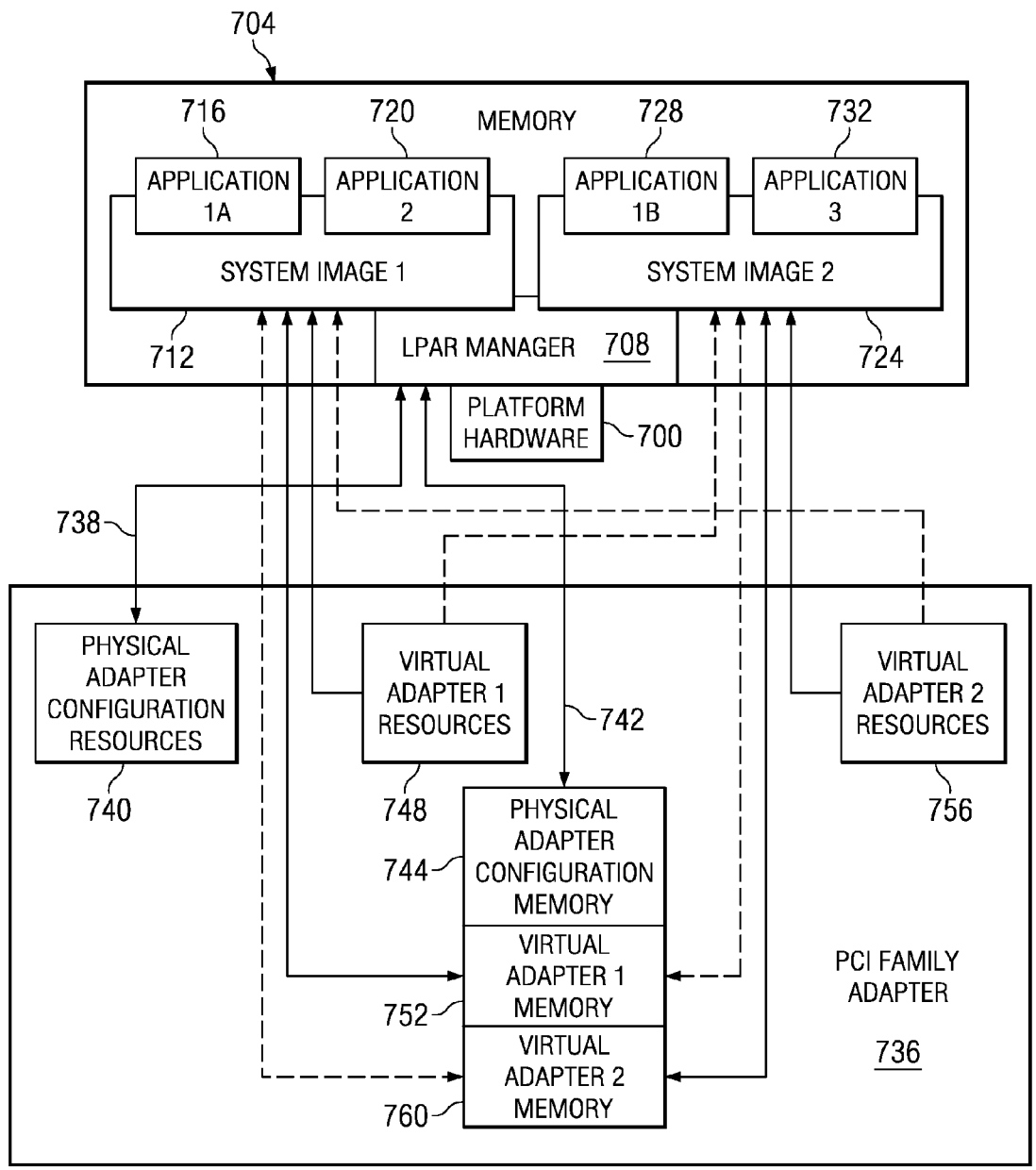
FIG. 7 is a diagram illustrating the I/O virtualization functions provided in a host processor node in order to provide virtual host access isolation in accordance with a preferred embodiment of the present invention.

With reference now to FIG. 7, a functional block diagram of a PCI adapter, such as PCI family adapter 736, and the firmware and software that run on host hardware (e.g. processor with possibly an I/O hub or I/O bridge), such as host hardware 700, is depicted in accordance with a preferred embodiment of the present invention.

FIG. 7 also shows a logical partitioning (LPAR) manager 708 running on host hardware 700. LPAR manager 708 may be implemented as a Hypervisor manufactured by International Business Machines, Inc. of Armonk, N.Y. LPAR manager 708 can run in firmware, software, or a combination of the two. LPAR manager 708 hosts two system image (SI) partitions, such as system image 712 and system image 724 (illustratively designated system image 1 and system image 2, respectively). The system image partitions may be respective operating systems running in software, a special purpose image running in software, such as a storage block server or storage file server image, or a special purpose image running in firmware. Applications can run on these system images, such as applications 716, 720, 728, and 732 (illustratively designated application 1A, application 2, application 1B and application 3). Applications 716 and 728 are representative of separate instances of a common application program, and are thus illustratively designated with respective references of "1A" and "1B". In the illustrative example, application 716 and 720 run on system image 712 and applications 728 and 732 run on system image 724. As referred to herein, a virtual host comprises a system image, such as system image 712, or the combination of a system image and applications running within the system image. Thus, two virtual hosts are depicted in FIG. 7.

PCI family adapter 736 contains a set of physical adapter configuration resources 740 and physical adapter memory resources 744. The physical adapter configuration resources 740 and physical adapter memory resources 744 contain information describing the number of virtual adapters that PCI family adapter 736 can support and the physical resources allocated to each virtual adapter. As referred to herein, a virtual adapter is an allocation of a subset of physical adapter resources and virtualized resources, such as a subset of physical adapter resources and physical adapter memory, that is associated with a logical partition, such as system image 712 and applications 716 and 720 running on system image 712, as described more fully hereinbelow. LPAR manager 708 is provided a physical configuration resource interface 738, and physical memory configuration interface 742 to read and write into the physical adapter configuration resource and memory spaces during the adapter's initial configuration and reconfiguration. Through the physical configuration resource interface 738 and physical configuration memory interface 742, LPAR manager 708 creates virtual adapters and assigns physical resources to each virtual adapter. LPAR manager 708 may use one of the system images, for example a special software or firmware partition, as a hosting partition that uses physical configuration resource interface 738 and physical configuration memory interface 742 to perform a portion, or even all, of the virtual adapter initial configuration and reconfiguration functions.

FIG. 7 shows a configuration of PCI family adapter 736 configured with two virtual adapters. A first virtual adapter (designated virtual adapter 1) comprises virtual adapter resources 748 and virtual adapter memory 752 that were assigned by LPAR manager 708 and that is associated with system image 712 (designated system image 1). Similarly, a second virtual adapter (designated virtual adapter 2) comprises virtual adapter resources 756 and virtual adapter memory 760 that were assigned by LPAR manager 708 to virtual adapter 2 and that is associated with another system image 724 (designated system image 2). For an adapter used to connect to a direct attached storage, such as direct attached storage 108, 132, or 156 shown in FIG. 1, examples of virtual adapter resources may include: the list of the associated physical disks, a list of the associated logical unit numbers, and a list of the associated adapter functions (e.g., redundant arrays of inexpensive disks (RAID) level). For an adapter used to connect to a network, such as network 120 of FIG. 1, examples of virtual adapter resources may include: a list of the associated link level identifiers, a list of the associated network level identifiers, a list of the associated virtual fabric identifiers (e.g. Virtual LAN IDs for Ethernet fabrics, N-port IDs for Fibre Channel fabrics, and partition keys for Infini-Band fabrics), and a list of the associated network layers functions (e.g. network offload services).

After LPAR manager 708 configures the PCI family adapter 736, each system image is allowed to only communicate with the virtual adapters that were associated with that system image by LPAR manager 708. As shown in FIG. 7 (by solid lines), system image 712 is allowed to directly communicate with virtual adapter resources 748 and virtual adapter memory 752 of virtual adapter 1. System image 712 is not allowed to directly communicate with virtual adapter resources 756 and virtual adapter memory 760 of virtual adapter 2 as shown in FIG. 7 by dashed lines. Similarly, system image 724 is allowed to directly communicate with virtual adapter resources 756 and virtual adapter memory 760 of virtual adapter 2, and is not allowed to directly communicate with virtual adapter resources 748 and virtual adapter memory 752 of virtual adapter 1.

Figure 8:
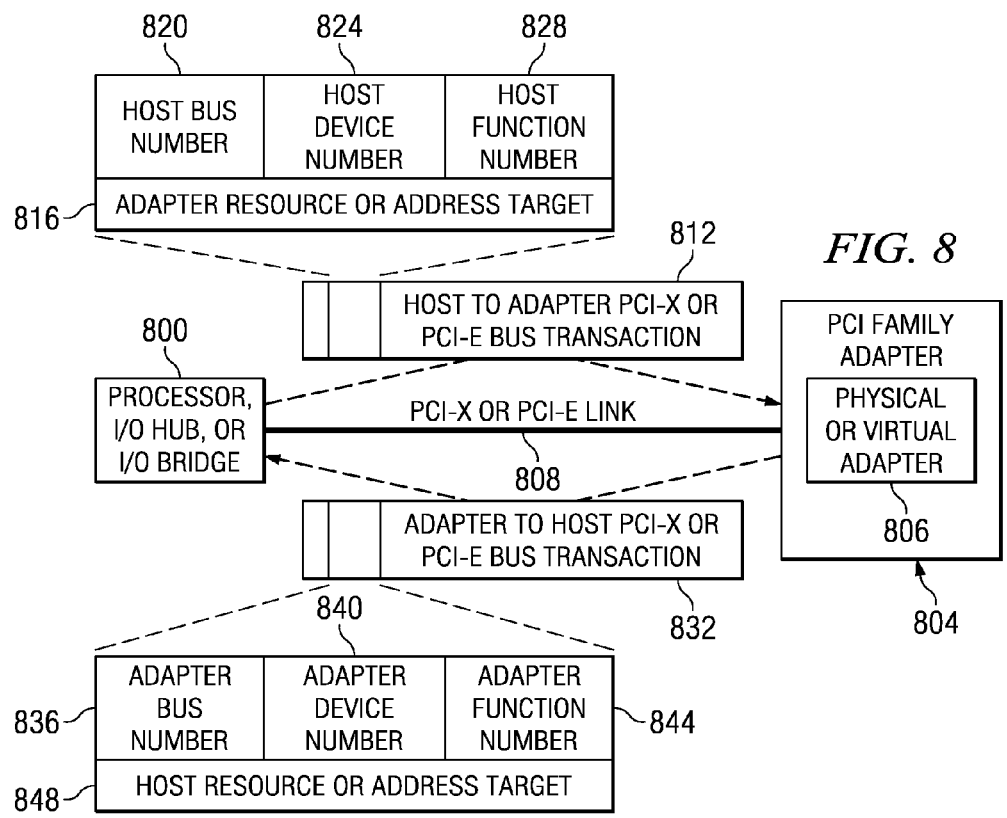
FIG. 8 is a diagram illustrating the control fields used in the PCI bus transaction to identify a virtual adapter or system image in accordance with a preferred embodiment of the present invention.

With reference now to FIG. 8, a depiction of a component, such as a processor, I/O hub, or I/O bridge 800, inside a host node, such as small host node 100, large host node 124, or small, integrated host node 144 shown in FIG. 1, that attaches a PCI family adapter, such as PCI family adapter 804, through a PCI-X or PCI-E link, such as PCI-X or PCI-E Link 808, in accordance with a preferred embodiment of the present invention is shown.

FIG. 8 shows that when a system image, such as system image 712 or 724, or LPAR manager 708 shown in FIG. 7 performs a PCI-X or PCI-E bus transaction, such as host to adapter PCI-X or PCI-E bus transaction 812, the processor, I/O hub, or I/O bridge 800 that connects to the PCI-X or PCI-E link 808 which issues the host to adapter PCI-X or PCI-E bus transaction 812 fills in the bus number, device number, and function number fields in the PCI-X or PCI-E bus transaction. The processor, I/O hub, or I/O bridge 800 has two options for how to fill in these three fields: it can either use the same bus number, device number, and function number for all software components that use the processor, I/O hub, or I/O bridge 800; or it can use a different bus number, device number, and function number for each software component that uses the processor, I/O hub, or I/O bridge 800. The originator or initiator of the transaction may be a software component, such as system image 712 or system image 724 (or an application running on a system image), or LPAR manager 708.

If the processor, I/O hub, or I/O bridge 800 uses the same bus number, device number, and function number for all transaction initiators, then when a software component initiates a PCI-X or PCI-E bus transaction, such as host to adapter PCI-X or PCI-E bus transaction 812, the processor, I/O hub, or I/O bridge 800 places the processor, I/O hub, or I/O bridge's bus number in the PCI-X or PCI-E bus transaction's requester bus number field 820, such as requester bus number 544 field of the PCI-X transaction shown in FIG. 5 or requester bus number 684 field of the PCI-E transaction shown in FIG. 6. Similarly, the processor, I/O hub, or I/O bridge 800 places the processor, I/O hub, or I/O bridge's device number in the PCI-X or PCI-E bus transaction's requester device number 824 field, such as requester device number 548 field shown in FIG. 5 or requester device number 688 field shown in FIG. 6. Finally, the processor, I/O hub, or I/O bridge 800 places the processor, I/O hub, or I/O bridge's function number in the PCI-X or PCI-E bus transaction's requester function number 828 field, such as requester function number 552 field shown in FIG. 5 or requester function number 692 field shown in FIG. 6. The processor, I/O hub, or I/O bridge 800 also places in the PCI-X or PCI-E bus transaction the physical or virtual adapter memory address to which the transaction is targeted as shown by adapter resource or address 816 field in FIG. 8.

If the processor, I/O hub, or I/O bridge 800 uses a different bus number, device number, and function number for each transaction initiator, then the processor, I/O hub, or I/O bridge 800 assigns a bus number, device number, and function number to the transaction initiator. When a software component initiates a PCI-X or PCI-E bus transaction, such as host to adapter PCI-X or PCI-E bus transaction 812, the processor, I/O hub, or I/O bridge 800 places the software component's bus number in the PCI-X or PCI-E bus transaction's requester bus number 820 field, such as requester bus number 544 field shown in FIG. 5 or requester bus number 684 field shown in FIG. 6. Similarly, the processor, I/O hub, or I/O bridge 800 places the software component's device number in the PCI-X or PCI-E bus transaction's requester device number 824 field, such as requester device number 548 field shown in FIG. 5 or requester device number 688 field shown in FIG. 6. Finally, the processor, I/O hub, or I/O bridge 800 places the software component's function number in the PCI-X or PCI-E bus transaction's requester function number 828 field, such as requester function number 552 field shown in FIG. 5 or requester function number 692 field shown in FIG. 6. The processor, I/O hub, or I/O bridge 800 also places in the PCI-X or PCI-E bus transaction the physical or virtual adapter memory address to which the transaction is targeted as shown by adapter resource or address field 816 in FIG. 8.

FIG. 8 also shows that when physical or virtual adapter 806 performs PCI-X or PCI-E bus transactions, such as adapter to host PCI-X or PCI-E bus transaction 832, the PCI family adapter, such as PCI physical family adapter 804, that connects to PCI-X or PCI-E link 808 which issues the adapter to host PCI-X or PCI-E bus transaction 832 places the bus number, device number, and function number associated with the physical or virtual adapter that initiated the bus transaction in the requester bus number, device number, and function number 836, 840, and 844 fields. Notably, to support more than one bus or device number, PCI family adapter 804 must support one or more internal busses (For a PCI-X adapter, see the PCI-X Addendum to the PCI Local Bus Specification Revision 1.0 or 1.0a; for a PCI-E adapter see PCI-Express Base Specification Revision 1.0 or 1.0a the details of which are herein incorporated by reference). To perform this function, LPAR manager 708 associates each physical or virtual adapter to a software component running by assigning a bus number, device number, and function number to the physical or virtual adapter. When the physical or virtual adapter initiates an adapter to host PCI-X or PCI-E bus transaction, PCI family adapter 804 places the physical or virtual adapter's bus number in the PCI-X or PCI-E bus transaction's requester bus number 836 field, such as requester bus number 544 field shown in FIG. 5 or requester bus number 684 field shown in FIG. 6 (shown in FIG. 8 as adapter bus number 836). Similarly, PCI family adapter 804 places the physical or virtual adapter's device number in the PCI-X or PCI-E bus transaction's requester device number 840 field, such as Requestor device Number 548 field shown in FIG. 5 or requester device number 688 field shown in FIG. 6 (shown in FIG. 8 as adapter device number 840). PCI family adapter 804 places the physical or virtual adapter's function number in the PCI-X or PCI-E bus transaction's requester function number 844 field, such as requester function number 552 field shown in FIG. 5 or requester function number 692 field shown in FIG. 6 (shown in FIG. 8 as adapter function number 844). Finally, PCI family adapter 804 also places in the PCI-X or PCI-E bus transaction the memory address of the software component that is associated, and targeted by, the physical or virtual adapter in host resource or address 848 field.

With reference now to FIG. 9, a functional block diagram of a PCI adapter with two virtual adapters depicted in accordance with a preferred embodiment of the present invention is shown. Exemplary PCI family adapter 900 is configured with two virtual adapters 916 and 920 (illustratively designated virtual adapter 1 and virtual adapter 2). PCI family adapter 900 may contain one (or more) PCI family adapter ports (also referred to herein as an upstream port), such as PCI-X or PCI-E adapter port 912 that interface with a host system, such as small host node 100, large host node 124, or small integrated host node 144 shown in FIG. 1. PCI family adapter 900 may also contain one (or more) device or network ports (also referred to herein as downstream ports), such as physical port 904 and physical port 908 that interface with a peripheral or network device.

FIG. 9 also shows the types of resources that can be virtualized on a PCI adapter. The resources of PCI family adapter 900 that may be virtualized include processing queues, address and configuration memory, adapter PCI ports, host memory management resources and downstream physical ports, such as device or network ports. In the illustrative example, virtualized resources of PCI family adapter 900 allocated to virtual adapter 916 include, for example, processing queues 924, address and configuration memory 928, PCI virtual port 936 that is a virtualization of adapter PCI port 912, host memory management resources 984 (such as memory region registration and memory window binding resources on InfiniBand or iWARP), and virtual device or network ports, such as virtual external port 932 and virtual external port 934 that are virtualizations of physical ports 904 and 908. PCI virtual ports and virtual device and network ports are also referred to herein simply as virtual ports. Similarly, virtualized resources of PCI family adapter 900 allocated to virtual adapter 920 include, for example, processing queues 940, address and configuration memory 944, PCI virtual port 952 that is a virtualization of adapter PCI port 912, host memory management resources 980, and virtual device or network ports, such as virtual external port 948 and virtual external port 950 that are respectively virtualizations of respective physical ports 904 and 908.

Turning next to FIG. 10, a functional block diagram of the access control levels on a PCI family adapter, such as PCI family adapter 900 shown in FIG. 9, is depicted in accordance with a preferred embodiment of the present invention. The three levels of access are a super-privileged physical resource allocation level 1000, a privileged virtual resource allocation level 1008, and a non-privileged level 1016.

The functions performed at the super-privileged physical resource allocation level 1000 include but are not limited to: PCI family adapter queries, creation, modification and deletion of virtual adapters, submission and retrieval of work, reset and recovery of the physical adapter, and allocation of physical resources to a virtual adapter instance. The PCI family adapter queries are used to determine, for example, the physical adapter type (e.g. Fibre Channel, Ethernet, iSCSI, parallel SCSI), the functions supported on the physical adapter, and the number of virtual adapters supported by the PCI family adapter. The LPAR manager, such as LPAR manager 708 shown in FIG. 7, performs the physical adapter resource management 1004 functions associated with super-privileged physical resource allocation level 1000. However, the LPAR manager may use a system image, for example an I/O hosting partition, to perform the physical adapter resource management 1004 functions.

The functions performed at the privileged virtual resource allocation level 1008 include, for example, virtual adapter queries, allocation and initialization of virtual adapter resources, reset and recovery of virtual adapter resources, submission and retrieval of work through virtual adapter resources, and, for virtual adapters that support offload services, allocation and assignment of virtual adapter resources to a middleware process or thread instance. The virtual adapter queries are used to determine: the virtual adapter type (e.g. Fibre Channel, Ethernet, iSCSI, parallel SCSI) and the functions supported on the virtual adapter. A system image, such as system image 712 shown in FIG. 7, performs the privileged virtual adapter resource management 1012 functions associated with virtual resource allocation level 1008.

Finally, the functions performed at the non-privileged level 1016 include, for example, query of virtual adapter resources that have been assigned to software running at the non-privileged level 1016 and submission and retrieval of work through virtual adapter resources that have been assigned to software running at the non-privileged level 1016. An application, such as application 716 shown in FIG. 7, performs the virtual adapter access library 1020 functions associated with non-privileged level 1016.

Turning next to FIG. 11, a functional block diagram of host memory addresses that are made accessible to a PCI family adapter is depicted in accordance with a preferred embodiment of the present invention. PCI family adapter 1101 is an example of PCI family adapter 900 that may have virtualized resources as described above in FIG. 9.

FIG. 11 depicts four different mechanisms by which a LPAR manager 708 can associate host memory to a system image and to a virtual adapter. Once host memory has been associated with a system image and a virtual adapter, the virtual adapter can then perform DMA write and read operations directly to the host memory. System images 1108 and 1116 are examples of system images, such as system images 712 and 724 described above with reference to FIG. 7, that are respectively associated with virtual adapters 1104 and 1112. Virtual adapters 1104 and 1112 are examples of virtual adapters, such as virtual adapters 916 and 920 described above with reference to FIG. 9, that comprise respective allocations of virtual adapter resources and virtual adapter memory.

The first exemplary mechanism that LPAR manager 708 can use to associate and make available host memory to a system image and to one or more virtual adapters is to write into the virtual adapter's resources a system image association list 1122. Virtual adapter resources 1120 contains a list of PCI bus addresses, where each PCI bus address in the list is associated by the platform hardware to the starting address of a system image (SI) page, such as SI 1 page 1 1128 through SI 1 page N 1136 allocated to system image 1108. Virtual adapter resources 1120 also contains the page size, which is equal for all the pages in the list. At initial configuration, and during reconfigurations, LPAR manager 708 loads system image association list 1122 into virtual adapter resources 1120. The system image association list 1122 defines the set of addresses that virtual adapter 1104 can use in DMA write and read operations. After the system image association list 1122 has been created, virtual adapter 1104 must validate that each DMA write or DMA read requested by system image 1108 is contained within a page in the system image association list 1122. If the DMA write or DMA read requested by system image 1108 is contained within a page in the system image association list 1122, then virtual adapter 1104 may perform the operation. Otherwise virtual adapter 1104 is prohibited from performing the operation. Alternatively, the PCI family adapter 1101 may use a special, LPAR manager-style virtual adapter (rather than virtual adapter 1104) to perform the check that determines if a DMA write or DMA read requested by system image 1108 is contained within a page in the system image association list 1122. In a similar manner, virtual adapter 1112 associated with system image 1116 validates DMA write or read requests submitted by system image 1116. Particularly, virtual adapter 1112 provides validation for DMA read and write requests from system image 1116 by determining whether the DMA write or read request is in a page in system image association list (configured in a manner similarly to system image association list 1122) associated with system image pages of system image 1116.

The second mechanism that LPAR manager 708 can use to associate and make available host memory to a system image and to one or more virtual adapters is to write a starting page address and page size into system image association list 1122 in the virtual adapter's resources. For example, virtual adapter resources 1120 may contain a single PCI bus address that is associated by the platform hardware to the starting address of a system image page, such as SI 1 Page 1 1128. System image association list 1122 in virtual adapter resources 1120 also contains the size of the page. At initial configuration, and during reconfigurations, LPAR manager 708 loads the page size and starting page address into system image association list 1122 into the virtual adapter resources 1120. The system image association list 1122 defines the set of addresses that virtual adapter 1104 can use in DMA write and read operations. After the system image association list 1122 has been created, virtual adapter 1104 validates whether each DMA write or DMA read requested by system image 1108 is contained within a page in system image association list 1122. If the DMA write or DMA read requested by system image 1108 is contained within a page in the system image association list 1122, then virtual adapter 1104 may perform the operation. Otherwise, virtual adapter 1104 is prohibited from performing the operation. Alternatively, the PCI family adapter 1101 may use a special, LPAR manager-style virtual adapter (rather than virtual adapter 1104) to perform the check that determines if a DMA write or DMA read requested by system image 1108 is contained within a page in the system image association list 1122. In a similar manner, virtual adapter 1112 associated with system image 1116 may validate DMA write or read requests submitted by system image 1116. Particularly, a system image association list similar to system image association list 1122 may be associated with virtual adapter 1112. The system image association list associated with virtual adapter 1112 is loaded with a page size and starting page address of a system image page of system image 1116 associated with virtual adapter 1112. The system image association list associated with virtual adapter 1112 thus provides a mechanism for validation of DMA read and write requests from system image 1116 by determining whether the DMA write or read request is in a page in a system image association list associated with system image pages of system image 1116.

The third mechanism that LPAR manager 708 can use to associate and make available host memory to a system image and to one or more virtual adapters is to write into the virtual adapter's resources a system image buffer association list 1154. In FIG. 11, virtual adapter resources 1150 contains a list of PCI bus address pairs (starting and ending address), where each pair of PCI bus addresses in the list is associated by the platform hardware to a pair (starting and ending) of addresses of a system image buffer, such as SI 2 Buffer 1 1166 through SI 2 Buffer N 1180 allocated to system image 1116. At initial configuration, and during reconfigurations, LPAR manager 708 loads system image buffer association list 1154 into the virtual adapter resources 1150. The system image buffer association list 1154 defines the set of addresses that virtual adapter 1112 can use in DMA write and read operations. After the system image buffer association list 1154 has been created, virtual adapter 1112 validates whether each DMA write or DMA read requested by system image 1116 is contained within a buffer in system image buffer association list 1154. If the DMA write or DMA read requested by system image 1116 is contained within a buffer in the system image buffer association list 1154, then virtual adapter 1112 may perform the operation. Otherwise, virtual adapter 1112 is prohibited from performing the operation. Alternatively, the PCI family adapter 1101 may use a special, LPAR manager-style virtual adapter (rather than virtual adapter 1112) to perform the check that determines if DMA write or DMA read operations requested by system image 1116 is contained within a buffer in the system image buffer association list 1154. In a similar manner, virtual adapter 1104 associated with system image 1108 may validate DMA write or read requests submitted by system image 1108. Particularly, virtual adapter 1104 provides validation for DMA read and write requests from system image 1108 by determining whether the DMA write or read requested by system image 1108 is contained within a buffer in a buffer association list that contains PCI bus starting and ending address pairs in association with system image buffer starting and ending address pairs of buffers allocated to system image 1108 in a manner similar to that described above for system image 1116 and virtual adapter 1112.

The fourth mechanism that LPAR manager 708 can use to associate and make available host memory to a system image and to one or more virtual adapters is to write into the virtual adapter's resources a single starting and ending address in system image buffer association list 1154. In this implementation, virtual adapter resources 1150 contains a single pair of PCI bus starting and ending address that is associated by the platform hardware to a pair (starting and ending) of addresses associated with a system image buffer, such as SI 2 Buffer 1 1166. At initial configuration, and during reconfigurations, LPAR manager 708 loads the starting and ending addresses of SI 2 buffer 1 1166 into the system image buffer association list 1154 in virtual adapter resources 1150. The system image buffer association list 1154 then defines the set of addresses that virtual adapter 1112 can use in DMA write and read operations. After the system image buffer association list 1154 has been created, virtual adapter 1112 validates whether each DMA write or DMA read requested by system image 1116 is contained within the system image buffer association list 1154. If the DMA write or DMA read requested by system image 1116 is contained within system image buffer association list 1154, then virtual adapter 1112 may perform the operation. Otherwise, virtual adapter 1112 is prohibited from performing the operation. Alternatively, the PCI family adapter 1101 may use a special, LPAR manager-style virtual adapter (rather than virtual adapter 1150) to perform the check that determines if DMA write or DMA read requested by system image 1116 is contained within a page system image buffer association list 1154. In a similar manner, virtual adapter 1104 associated with system image 1108 may validate DMA write or read requests submitted by system image 1108. Particularly, virtual adapter 1104 provides validation for DMA read and write requests from system image 1108 by determining whether the DMA write or read requested by system image 1108 is contained within a buffer in a buffer association list that contains a single PCI bus starting and ending address in association with a system image buffer starting and ending address allocated to system image 1108 in a manner similar to that described above for system image 1116 and virtual adapter 1112.

Figure 12:
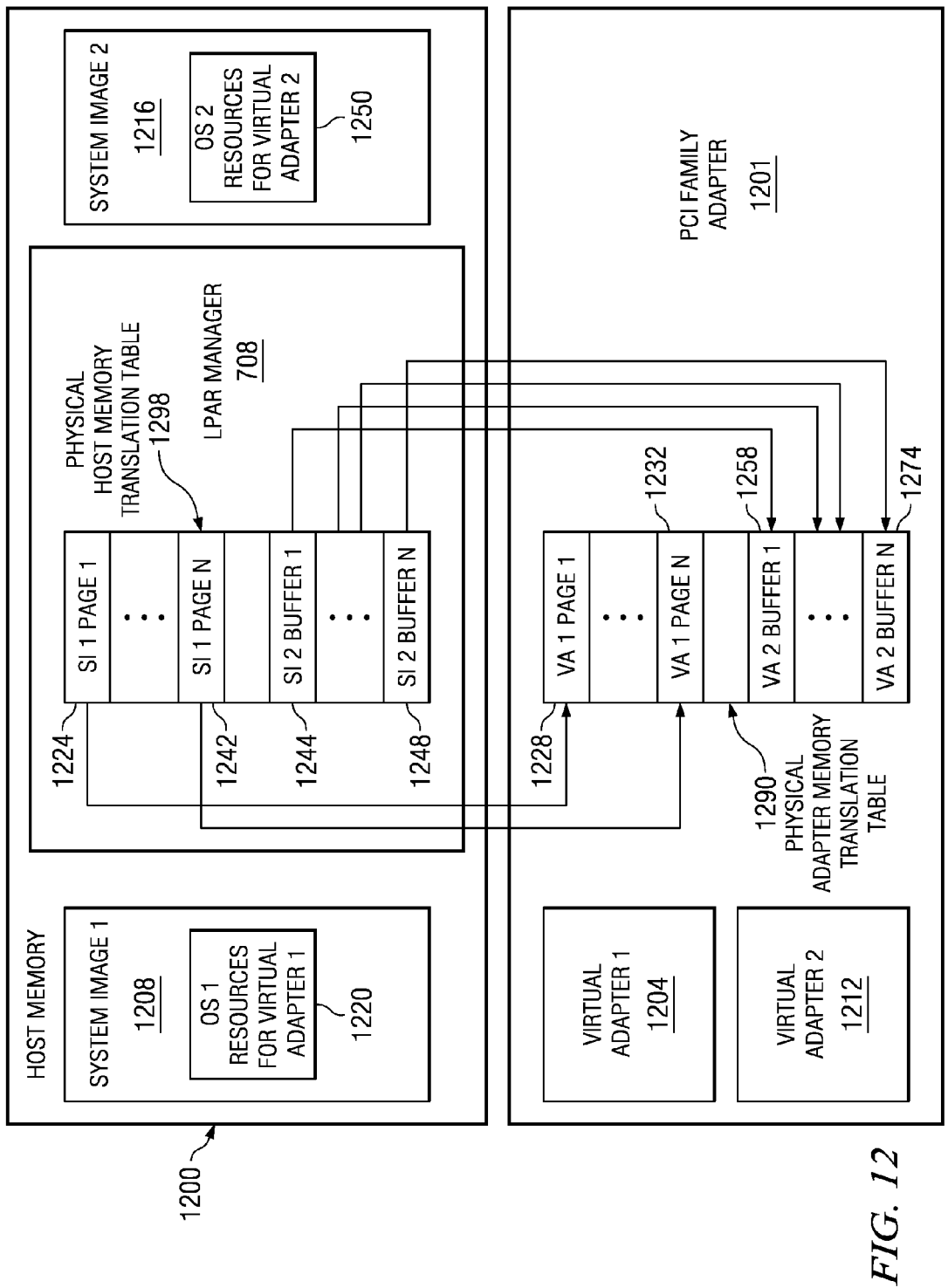
FIG. 12 is a diagram illustrating how a PCI family adapter allows an LPAR manager to associate memory in the PCI adapter to a system image and its associated virtual adapter in accordance with a preferred embodiment of the present invention.

Turning next to FIG. 12, a functional block diagram of a PCI family adapter configured with memory addresses that are made accessible to a system image is depicted in accordance with a preferred embodiment of the present invention.

FIG. 12 depicts four different mechanisms by which a LPAR manager can associate PCI family adapter memory to a virtual adapter, such as virtual adapter 1204, and to a system image, such as system image 1208. Once PCI family adapter memory has been associated to a system image and a virtual adapter, the system image can then perform Memory Mapped I/O write and read (i.e., store and load) operations directly to the PCI family adapter memory.

A notable difference between the system image and virtual adapter configuration shown in FIG. 11 and FIG. 12 exists. In the configuration shown in FIG. 11, PCI family adapter 1101 only holds a list of host addresses that do not have any local memory associated with them. If the PCI family adapter supports flow-through traffic, then data arriving on an external port can directly flow through the PCI family adapter and be transferred, through DMA writes, directly into these host addresses. Similarly, if the PCI family adapter supports flow-through traffic, then data from these host addresses can directly flow through the PCI family adapter and be transferred out of an external port. Accordingly, PCI family adapter 1101 shown in FIG. 11 does not include local adapter memory and thus is unable to initiate a DMA operation. On the other hand, PCI family adapter 1201 shown in FIG. 12 has local adapter memory that is associated with the list of host memory addresses. PCI family adapter 1201 can initiate, for example, DMA writes from its local memory to the host memory or DMA reads from the host memory to its local memory. Similarly, the host can initiate, for example, Memory Mapped I/O writes from its local memory to the PCI family adapter memory or Memory Mapped I/O reads from the PCI family adapter memory to the host's local memory.

The first and second mechanisms that LPAR manager 708 can use to associate and make available PCI family adapter memory to a system image and to a virtual adapter is to write into the PCI family adapter's physical adapter memory translation table 1290 a page size and the starting address of one (first mechanism) or more (second mechanism) pages. In this case all pages have the same size. For example, FIG. 12 depicts a set of pages that have been mapped between system image 1208 and virtual adapter 1204. Particularly, SI 1 Page 1 1224 through SI 1 Page N 1242 of system image 1208 are mapped (illustratively shown by interconnected arrows) to virtual adapter memory pages 1224-1232 of physical adapter 1201 local memory. For system image 1208, all associated pages 1224-1242 in the list have the same size. At initial configuration, and during reconfigurations, LPAR manager 708 loads the PCI family adapter's physical adapter memory translation table 1290 with the page size and the starting address of one or more pages. The physical adapter memory translation table 1290 then defines the set of addresses that virtual adapter 1204 can use in DMA write and read operations. After physical adapter memory translation table 1290 has been created, PCI family adapter 1201 (or virtual adapter 1204) validates that each DMA write or DMA read requested by system image 1208 is contained in the physical adapter memory translation table 1290 and is associated with virtual adapter 1204. If the DMA write or DMA read requested by system image 1208 is contained in the physical adapter memory translation table 1290 and is associated with virtual adapter 1204, then virtual adapter 1204 may perform the operation. Otherwise, virtual adapter 1204 is prohibited from performing the operation. The physical adapter memory translation table 1290 also defines the set of addresses that system image 1208 can use in Memory Mapped I/O (MMIO) write and read operations. After physical adapter memory translation table 1290 has been created, PCI family adapter 1201 (or virtual adapter 1204) validates whether the Memory Mapped I/O write or read requested by system image 1208 is contained in the physical adapter memory translation table 1290 and is associated with virtual adapter 1204. If the MMIO write or MMIO read requested by system image 1208 is contained in the physical adapter memory translation table 1290 associated with virtual adapter 1204, then virtual adapter 1204 may perform the operation. Otherwise virtual adapter 1204 is prohibited from performing the operation. It should be understood that in the present example, other system images and associated virtual adapters, e.g., system image 1216 and virtual adapter 1212, are configured in a similar manner for PCI family adapter 1201 (or virtual adapter 1212) validation of DMA operations and MMIO operations requested by system image 1216.

The third and fourth mechanisms that LPAR manager 708 can use to associate and make available PCI family adapter memory to a system image and to a virtual adapter is to write into the PCI family adapter's physical adapter memory translation table 1290 one (third mechanism) or more (fourth mechanism) buffer starting and ending addresses (or starting address and length). In this case, the buffers may have different sizes. For example, FIG. 12 depicts a set of varying sized buffers that have been mapped between system image 1216 and virtual adapter 1212. Particularly, SI 2 Buffer 1 1244 through SI 2 Buffer N 1248 of system image 1216 are mapped to virtual adapter buffers 1258-1274 of virtual adapter 1212. For system image 1216, the buffers in the list have different sizes. At initial configuration, and during reconfigurations, LPAR manager 708 loads the PCI family adapter's physical adapter memory translation table 1290 with the starting and ending address (or starting address and length) of one or more pages. The physical adapter memory translation table 1290 then defines the set of addresses that virtual adapter 1212 can use in DMA write and read operations. After physical adapter memory translation table 1290 has been created, PCI family adapter 1201 (or virtual adapter 1212) validates that each DMA write or DMA read requested by system image 1216 is contained in the physical adapter memory translation table 1290 and is associated with virtual adapter 1212. If the DMA write or DMA read requested by system image 1216 is contained in the physical adapter memory translation table 1290 and is associated with virtual adapter 1212, then virtual adapter 1212 may perform the operation. Otherwise, virtual adapter 1212 is prohibited from performing the operation. The physical adapter memory translation table 1290 also defines the set of addresses that system image 1216 can use in Memory Mapped I/O (MMIO) write and read operations. After physical adapter memory translation table 1290 has been created, PCI family adapter 1201 (or virtual adapter 1212) validates whether a MMIO write or read requested by system image 1216 is contained in the physical adapter memory translation table 1290 and is associated with virtual adapter 1212. If the MMIO write or MMIO read requested by system image 1216 is contained in the physical adapter memory translation table 1290 and is associated with virtual adapter 1212, then virtual adapter 1212 may perform the operation. Otherwise virtual adapter 1212 is prohibited from performing the operation. It should be understood that in the present example, other system images and associated virtual adapters, e.g., system image 1208 and associated virtual adapter 1204, are configured in a similar manner for PCI family adapter 1201 (or virtual adapter 1204) validation of DMA operations and MMIO operations requested by system image 1216.

Figure 13:
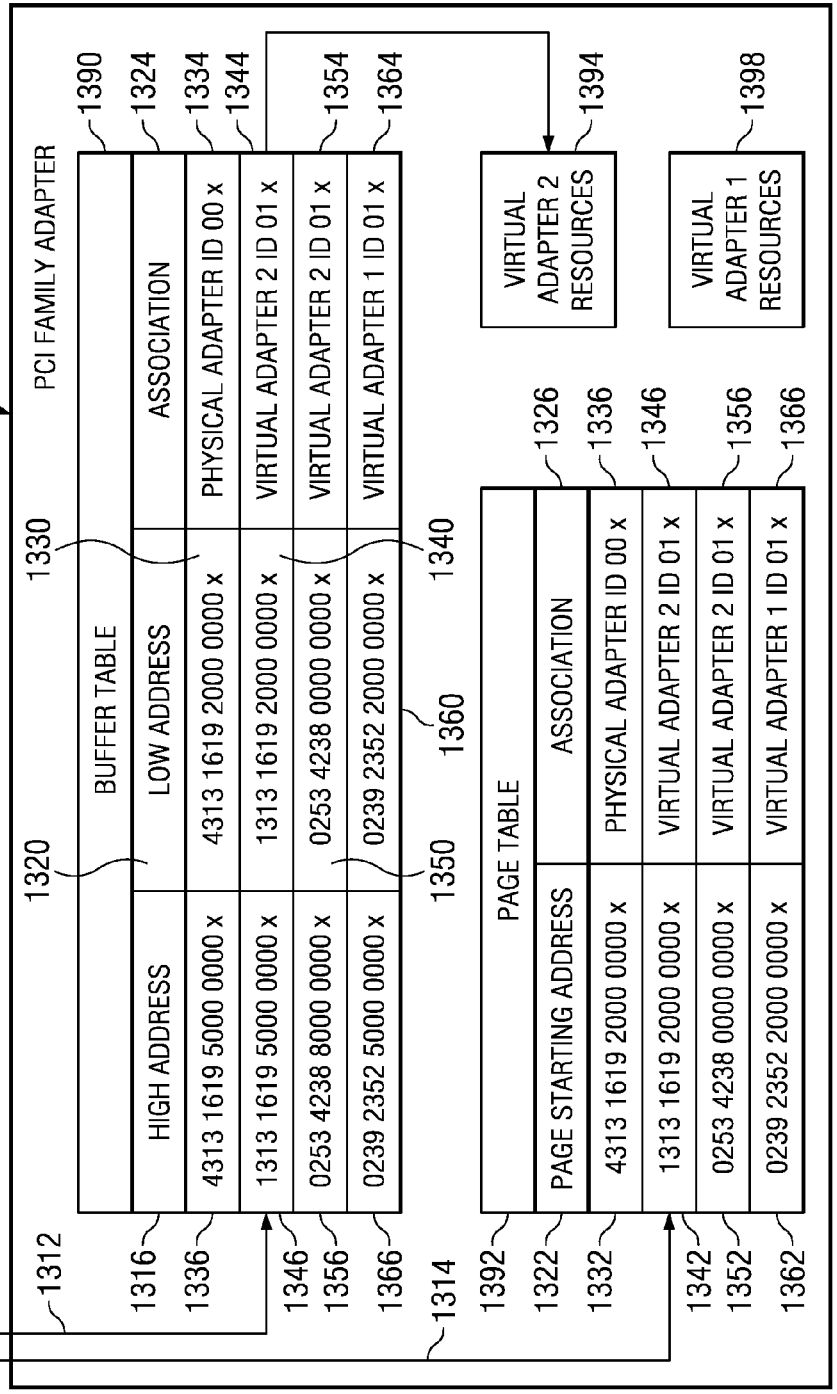
FIG. 13 is a diagram illustrating one of the options for determining a virtual adapter is associated with an incoming memory address to assure that the functions performed by an incoming PCI bus transaction are within the scope of the virtual adapter that is associated with the memory address referenced in the incoming PCI bus transaction translation in accordance with a preferred embodiment of the present invention.

With reference next to FIG. 13, a functional block diagram of a PCI family adapter and a physical address memory translation table, such as a buffer table or a page table, is depicted in accordance with a preferred embodiment of the present invention.

FIG. 13 also depicts four mechanisms for how an address referenced in an incoming PCI bus transaction 1304 can be used to look up the virtual adapter resources (including the local PCI family adapter memory address that has been mapped to the host address), such as virtual adapter resources 1394 or 1398, associated with the memory address.

The first mechanism is to compare the memory address of incoming PCI bus transaction 1304 with each row of high address cell 1316 and low address cell 1320 in buffer table 1390. High address cell 1316 and low address cell 1320 respectively define an upper and lower address of a range of addresses associated with a corresponding virtual or physical adapter identified in association cell 1324. If incoming PCI bus transaction 1304 has an address that is lower than the contents of high address cell 1316 and that is higher than the contents of low address cell 1320, then incoming PCI bus transaction 1304 is within the high address and low address cells that are associated with the corresponding virtual adapter identified in association cell 1324. In such a scenario, the incoming PCI bus transaction 1304 is allowed to be performed on the matching virtual adapter. Alternatively, if incoming PCI bus transaction 1304 has an address that is not between the contents of high address cell 1316 and the contents of low address cell 1320, then completion or processing of incoming PCI bus transaction 1304 is prohibited. The second mechanism is to simply allow a single entry in buffer table 1390 per virtual adapter.

The third mechanism is to compare the memory address of incoming PCI bus transaction 1304 with each row of page starting address cell 1322 and with each row of page starting address cell 1322 plus the page size in page table 1392. If incoming PCI bus transaction 1304 has an address that is higher than or equal to the contents of page starting address cell 1322 and lower than page starting address cell 1322 plus the page size, then incoming PCI bus transaction 1304 is within a page that is associated with a virtual adapter. Accordingly, incoming PCI bus transaction 1304 is allowed to be performed on the matching virtual adapter. Alternatively, if incoming PCI bus transaction 1304 has an address that is not within the contents of page starting address cell 1322 and page starting address cell 1322 plus the page size, then completion of incoming PCI bus transaction 1304 is prohibited. The fourth mechanism is to simply allow a single entry in page table 1392 per virtual adapter.

Figure 14:
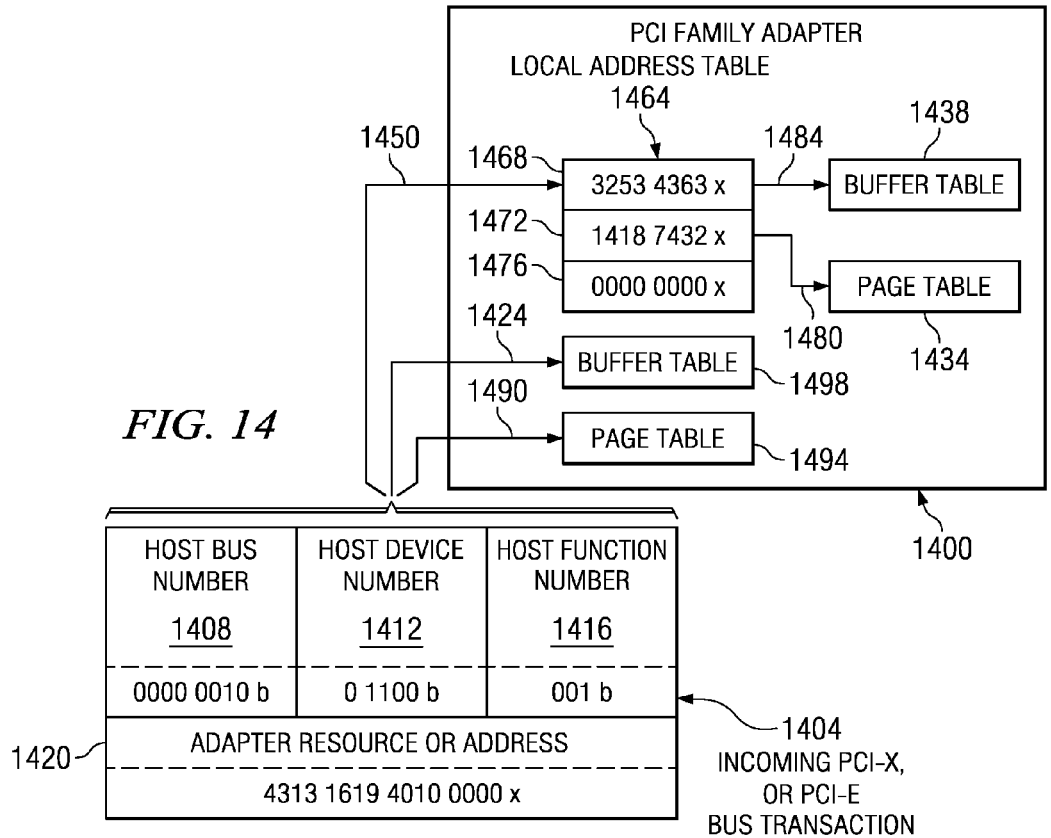
FIG. 14 is a diagram illustrating one of the options for determining a virtual adapter is associated with a PCI-X or PCI-E bus transaction to assure that the functions performed by an incoming PCI bus transaction are within the scope of the virtual adapter that is associated with the requester bus number, requester device number, and requester function number referenced in the incoming PCI bus transaction translation in accordance with a preferred embodiment of the present invention.

With reference next to FIG. 14, a functional block diagram of a PCI family adapter and a physical address memory translation table, such as a buffer table, a page table, or an indirect local address table, is depicted in accordance with a preferred embodiment of the present invention.

FIG. 14 also depicts several mechanisms for how a requester bus number, such as host bus number 1408, a requester device number, such as host device number 1412, and a requester function number, such as host function number 1416, referenced in incoming PCI bus transaction 1404 can be used to index into either buffer table 1498, page table 1494, or indirect local address table 1464. Buffer table 1498 is representative of buffer table 1390 shown in FIG. 13. Page table 1490 is representative of page table 1392 shown in FIG. 13. Local address table 1464 contains a local PCI family adapter memory address that references either a buffer table, such as buffer table 1438, or a page table, such as page table 1434, that only contains host memory addresses that are mapped to the same virtual adapter.

The requester bus number, such as host bus number 1408, requester device number, such as host device number 1412, and requester function number, such as host function number 1416, referenced in incoming PCI bus transaction 1404 provides an additional check beyond the memory address mappings that were set up by a host LPAR manager.

The present invention provides a method, system, and computer program product for efficient and flexible sharing of adapter resources among multiple operating system instances. The mechanism of the present invention allows for implementing flexible and dynamic resource allocation of virtualized I/O adapters, without adding complexity to the adapter implementation. The present invention separates the operation of adapter resource allocation from adapter resource management. Adapter resource allocation is performed by a hypervisor using a privileged address range, and adapter resource initialization is performed by an OS using an OS non-privileged address range. This flexible and dynamic allocation policy allows the hypervisor to perform adapter resource allocation and track allocated adapter resources.

Each adapter has a limited set of adapter resources. The variety of resources available depends on the adapter. For example, a Remote Direct Memory Access enabled Network Interface Controller (RNIC) I/O adapter providing RDMA capabilities has a wide set of different resources, such as: Queue Pairs (QP), Completion Queues (CQ), Protection Blocks (PB), Translation Tables (TT), etc. However, the I/O adapter still only supports a limited number of QPs, CQs, PBs and size of TT, etc. Since each partition may have its own needs (which are not necessarily the same for different partitions), it is advantageous to share resources according to partition demands rather than sharing all adapter resources in an equal manner, where each partition receives the same number of QPs, CQ, PBs, and size of TT.

The mechanism of the present invention also allows for sharing this variety of resources between different partitions according to the partition demands. Each I/O adapter resource is composed from multiple resource fields. The present invention provides for differentiating between address ranges in the fields, such that each adapter resource field may be accessed via a different address range. In addition, the access permissions depend on the address range through which the adapter resource field has been accessed. Example address ranges on the I/O adapter include a privileged address range, an OS non-privileged range, and an application non-privileged range. These address ranges are set to correspond to access levels in the partitioned server in the illustrative examples. For example, the privileged address range corresponds to the hypervisor access level, an OS non-privileged range corresponds to an OS access level, and an application non-privileged range corresponds to an application access level.

In particular, the hypervisor uses the privileged address range to perform physical resource allocation of adapter resources, and each adapter resource is associated with a particular partition/OS instance. OS non-privileged address range may be used by an operating system instance to access the adapter resources and perform initialization/management of those resources. These resources are owned by the OS instance and were previously allocated by hypervisor and associated with that OS instance. Application non-privileged address range may be used by an application running in the environment of the operating system instance to access the adapter resources owned by that OS instance.

Each PCI adapter resource associated with a particular partition/OS instance is located in the same I/O page. An I/O page refers to the I/O addressing space, typically in 4 KB pages, which is mapped by an OS or hypervisor to the hypervisor, OS or application address space respectively, and then may be accessed by a hypervisor, OS or application. By associating the adapter resources in the same I/O page with the same partition/OS instance, Virtual Memory Manager (VMM) services may be used to protect unauthorized access of one OS instance (and applications running in that OS environment) to the resources allocated for the other OS instance. Access may be controlled by mapping a particular I/O page to be owned by particular partition. Such mapping allows for restricting access to the I/O address space in page granularity, thus allowing access protection.

Once the adapter resource is allocated by the hypervisor for the particular OS instance, this adapter resource can remain in possession of the OS instance. The OS instance owns the allocated adapter resource and may reuse it multiple times. The hypervisor also may reassign an adapter resource by revoking OS ownership of the previously allocated resource and grant ownership on that resource to another OS instance. These adapter resources are allocated and revoked on an I/O page basis.

In addition, an adapter may restrict/differentiate access to the adapter resource context fields for the software components with different privilege levels. Each resource context field has an associated access level, and I/O address ranges are used to identify the access level of the software that accesses the adapter resource context. Each access level (privileged, OS non-privileged and application) has an associated address range in adapter I/O space that can be used to access adapter resources. For example, fields having a privileged access level may be accessed by the I/O transaction initiated through the privileged address range only. Fields having an OS non-privileged access level may be accessed by the I/O transactions initiated through the privileged and OS non-privileged address ranges. In this manner, multiple OS instances may efficiently and flexibly share adapter resources, while the adapter enforces access level control to the adapter resources.

Figure 15:
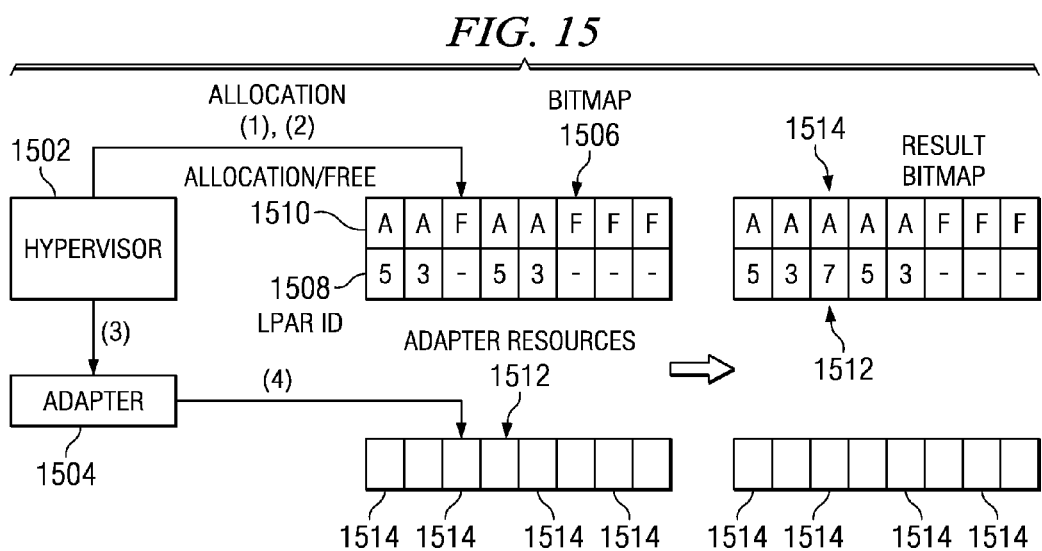
FIG. 15 is a diagram of an example resource allocation in accordance with a preferred embodiment of the present invention.

Turning now to FIG. 15, a diagram of an example resource allocation in accordance with a preferred embodiment of the present invention is shown. Hypervisor 1502 is responsible for the I/O adapter resource allocation/deallocation, as well as the association of the allocated resource with a particular partition (OS instance). Once hypervisor 1502 allocates a resource, this resource is managed by the OS instance directly without hypervisor involvement.

In particular, the left side of FIG. 15 shows the steps performed by hypervisor 1502 and adapter 1504 during the resource allocation sequence. The right side of this figure illustrates the result of the resource allocation. Hypervisor 1502 is aware of the capabilities of adapter 1504 (e.g., types of resources and the number of resources). Hypervisor 1502 determines how many resources to allocate for the given partition, as well as which instances of the given resource should be allocated for that partition. Once the determination is made, hypervisor 1502 performs the adapter resource allocation.

For example, hypervisor 1502 may keep bitmap 1506 of all adapter queue pairs QPs with an indication which QPs are allocated to which particular partition. When hypervisor 1502 wants to allocate a new QP(s) to the given partition, the hypervisor first searches for the available (not allocated) QPs in bitmap 1506. Hypervisor 1502 may use LPAR ID fields 1508 and alloc/free fields 1510 to locate available QPs in bitmap 1506.

Hypervisor 1502 then allocates those QPs for the partition by marking the particular LPAR ID field and corresponding alloc/free field in bitmap 1506, such as LPAR ID field 1512 and alloc/free field 1514, as allocated. Hypervisor 1502 then notifies adapter 1504 (or updates the structure of adapter 1504) to reflect that those QPs were allocated for the given partition. Adapter 1504 respectively updates its internal structure 1512 to reflect the allocation, as shown by allocated resources 1514. The process of deallocation or reassignment of adapter resources is similar to the allocation process described above.

Hypervisor 1502 is shown in FIG. 15 as storing the bitmap for each type of adapter resources and uses these bitmaps to manage adapter resource allocation. It must be noted that use of bitmap 1506 to keep a trace of adapter resource allocation is an example, and hypervisor 1502 may employ any other means for the tracing of allocated and available resources. Additionally, the allocation scheme described above does not assume contiguity of the resources allocated to one partition. In this manner, the allocation described above allows for the simple reassignment of resources from one partition to another.

Figure 16:
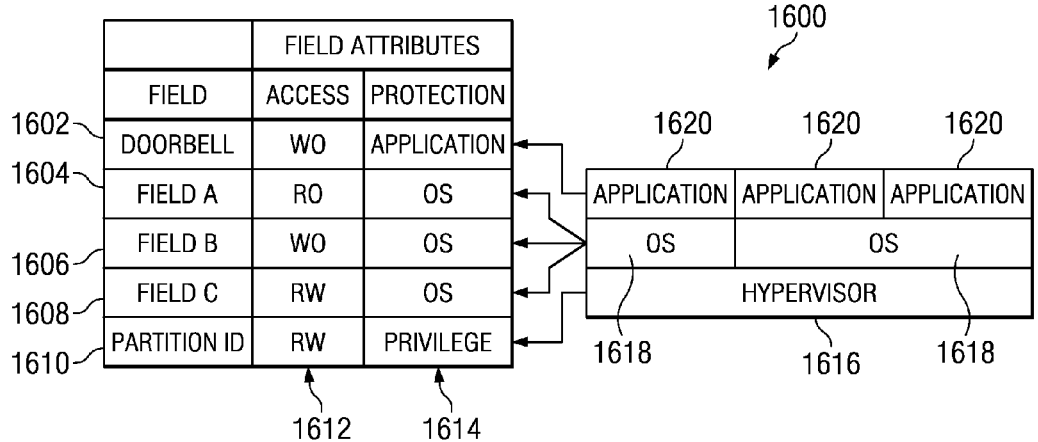
FIG. 16 is a diagram illustrating the resource context of an internal adapter structure in accordance with a preferred embodiment of the present invention.

FIG. 16 is a diagram illustrating the resource context of an internal adapter structure in accordance with a preferred embodiment of the present invention. Each adapter has an associated internal adapter structure, such as internal structure 1512 shown in FIG. 15, which includes a resource context. The present invention requires that the resource context may be accessed by the hypervisor, OS, or applications only via the IO adapter address space (the portion of I/O address space belonging to the adapter) regardless of the location of the adapter resource context (that means that even if adapter resource is located in the system memory, and therefore theoretically can be directly accessed by software, without going through the adapter, we do not allow this in the present invention) in the adapter and/or system memory.

As FIG. 16 illustrates, adapter resource context 1600 is comprised of different fields, such as fields 1602-1610. In the illustrative example, each field is associated with attributes, such as access permission attribute 1612 and protection permission attribute 1614, although each field may have other attributes as well. The present invention employs these protection attributes in the resource context structure to identify the protection level of software that may access each field. Access permission attribute 1612 identifies the allowed type of access to the field, such as write-only access to Doorbell field 1602. Access permissions may be, for example, read-only, write-only, read-write, and the like. Protection permission attribute 1614 identifies the protection level of the software that may access the field.

For example, some of the fields may be accessed only by hypervisor 1616 (such as identification of the partition which owns the resource), some fields may be accessed by OS level software 1618 (such as the TCP source port number), or some fields may be accessed directly by applications 1620. For example, Doorbell field 1602 may be accessed by an application, such as application 1620, through a write-only type access. In addition, it should be noted that if a field is allowed to be accessed by OS level software, then this field may also be accessed by the hypervisor as well. Likewise, if a field is allowed to be accessed by an application, then this field may also be accessed by the OS and the hypervisor as well.

Figure 17:
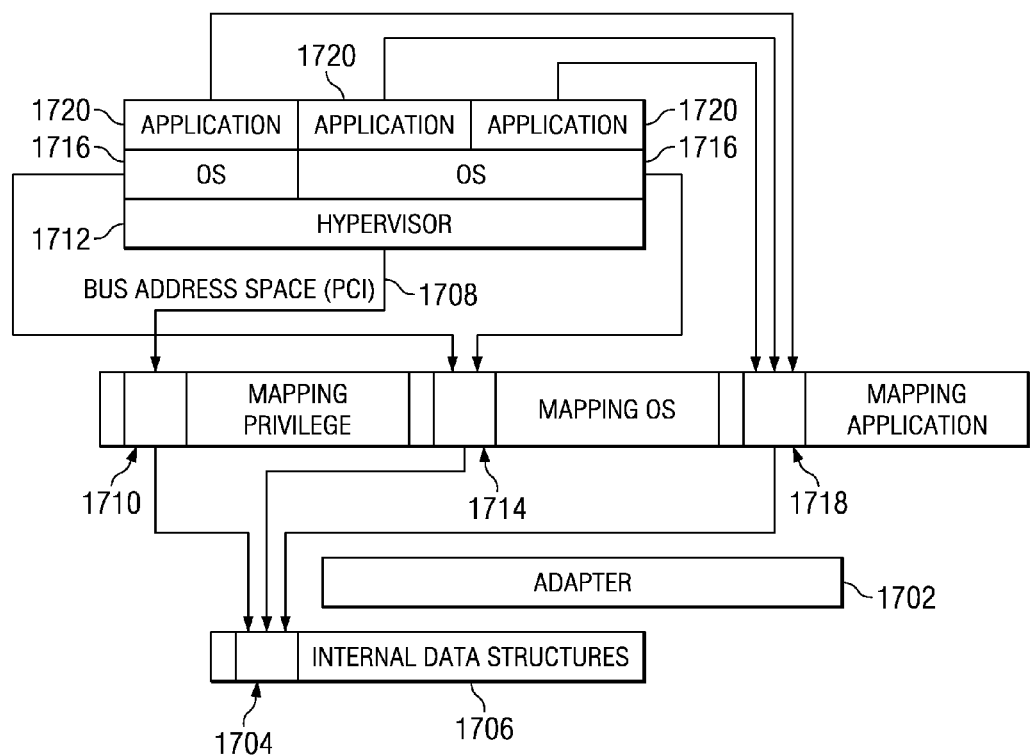
FIG. 17 is a diagram illustrating a mapping of adapter internal structures to the bus adapter space in accordance with a preferred embodiment of the present invention.

Turning now to FIG. 17, a diagram illustrating a mapping of adapter internal structures to the bus adapter space in accordance with a preferred embodiment of the present invention is depicted. This figure shows how validation of the access and protection permissions is enforced by the I/O adapter. I/O adapter 1702 uses the information from resource context fields 1602-1610 in FIG. 16 to enforce the access and protection permissions. I/O adapter 1702 contains a dedicated logic which detects and processes the access to adapter address space 1704. It must be noted that the view of internal adapter structure 1706 via adapter address space 1704 does not necessarily reflect the real structure and/or location of the adapter resource context in adapter 1702 or system memory.

In particular, FIG. 17 shows defined mappings (address ranges) of adapter resource contexts, such as resource context 1600 in FIG. 16, to bus address space (PCI address space) 1708. The mechanism of the present invention employs address mapping to identify the protection level (software of different protection level performs access using different address ranges). For example, privileged address range 1710 (or parts of it) may be mapped to hypervisor address space 1712. Non-privileged OS address range 1714 (or parts of it) may be mapped to the address space of each OS instance 1716. Non-privileged application address range 1718 (or parts of it) may be mapped to application address space 1720. These three mappings, mappings 1710, 1714, and 1718, are defined in a manner to permit the access of each resource context from each one of the mappings. Mappings 1710, 1714, and 1718 may be implemented using PCI base registers of three PCI functions of I/O adapter 1702, or using any other method. For example, one PCI function may be used to define the privileged address range, another to define the OS non-privileged address range, and the last to define the application non-privileged address range Mappings 1710, 1714, and 1718 may be accessed by software of the certain protection level. For instance, privileged address range 1710 is used by hypervisor 1712 to update respective fields of the resource context for an allocated, deallocated, or reassigned resource. Privileged address range 1710 is mapped by hypervisor to the hypervisor virtual address space. For example, each adapter resource context contains a partition ID field, such as partition ID field 1610 in FIG. 16, or any other field that can be used to differ resources belonging to one partition from resources belonging to another partition.

Partition ID field 1610 may be updated only by hypervisor 1712, and is initialized at resource allocation time. Partition ID field 1610 identifies the partition that owns this resource, and used by adapter 1702 to prevent unauthorized access of the partition resource by another partition. I/O adapter 1702 uses the address range validating policy described above to prevent change of the partition ID field by OS-level code.

OS address range 1714 is used by OS instance 1716 to access the resource context of the resource allocated for this OS instance. OS address range 1714 is used to perform resource initialization and management. OS address range 1714 (or more exactly its parts—I/O pages) are mapped to the OS virtual space during the resource allocation process.

Application address range 1718 is used by application 1720 running on a particular OS instance, such as OS instance 1716, to directly communicate with I/O adapter 1702. In this manner, application 1720 may avoid OS involvement (context switch) while sending and receiving data (so-called Doorbell ring operations). I/O pages from application address range 1718 are mapped to the application address space.

Thus, I/O adapter 1702 uses these address ranges/mappings to identify the protection level of software that accesses adapter internal structures. This information together with access and protection attributes associated with each resource context field, allows adapter 1702 to perform access and protection validation.

Figure 18A:
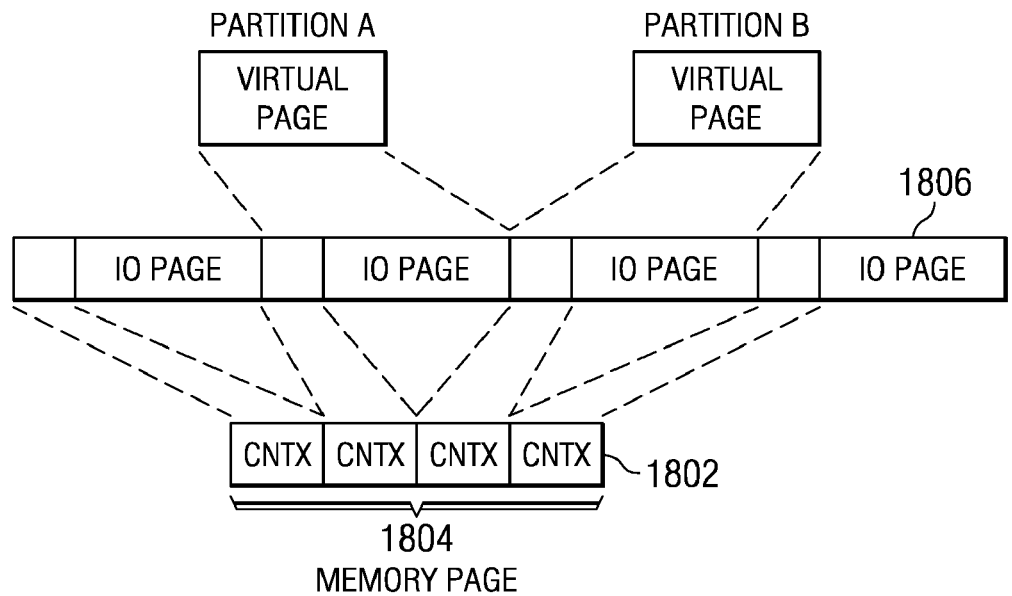
FIGS. 18A and 18B are diagrams illustrating resource context mappings from memory to adapter address space according to a preferred embodiment of the present invention.
Figure 18B:
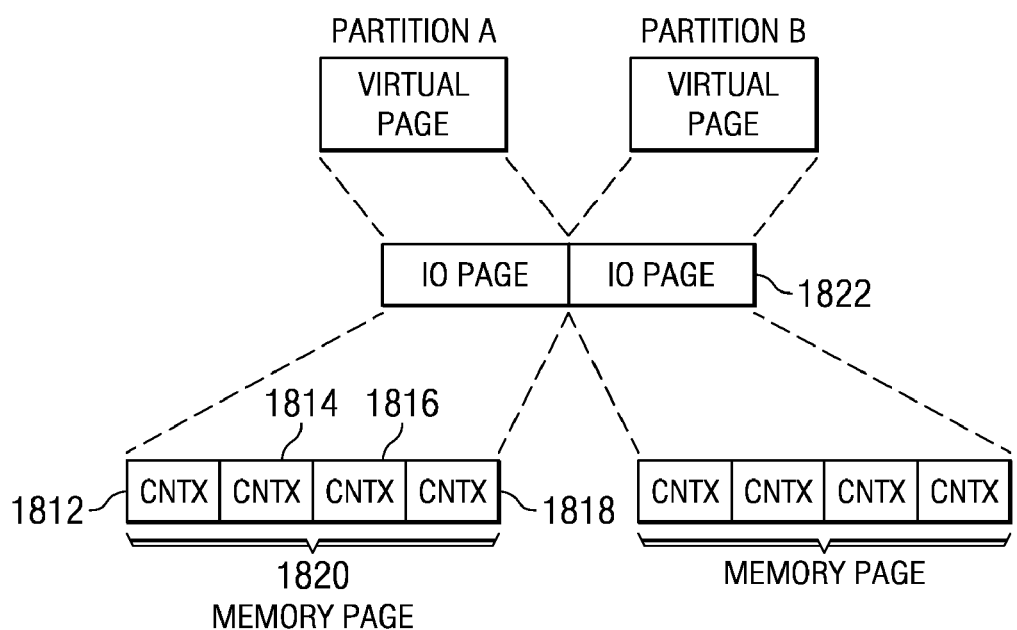

FIGS. 18A and 18B are diagrams illustrating resource context mappings from memory to adapter address space is depicted according to a preferred embodiment of the present invention. FIGS. 18A and 18B show direct mappings of the resource context to the adapter address space (to each address range), although any mapping may be used to implement the present invention. As different OS instances (partitions) use the same address range to access resource contexts, two conditions should be met to guarantee that one partition cannot access a resource context belonging to another partition. First, the I/O address space should be mapped to the OS/Application address space in units of pages (e.g. 4 KB). Consequently, the hypervisor may allow I/O mapping of only those I/O pages belonging to the given partition. Second, adapter resources which resource contexts are located on the same I/O page should belong to the same partition.

In particular, FIG. 18A illustrates one method in which a resource context may be directly mapped to adapter address space from memory. FIG. 18A illustrates that a resource context may be mapped from memory to adapter address space by mapping the resource context when the resource contexts are located on the same memory page. For example, resource context 1802 in memory page 1804 may be mapped to adapter address space. As shown, each resource context in memory page 1804 is mapped to adapter address space using a separate I/O page belonging to a given partition, such as I/O page 1806.

FIG. 18B illustrates another method in which a resource context may be directly mapped to adapter address space from memory. As FIG. 18B shows, a resource context may be mapped from memory to adapter address space by allocating all of the resources whose resource context falls on the same I/O page to the same partition. For example, resource contexts 1812-1818 in memory page 1820 may be mapped to adapter address space using the same I/O page, such as I/O page 1822.

The resource context fields in FIGS. 18A and 18B may be accessed using software that has knowledge of the structure of the resource context.

An alternative embodiment of the present invention for mapping the resource context to the adapter range is to employ a command-based approach. The command-based approach may be used in contrast with the direct mapping approach utilized in FIGS. 18A and 18B. This command-based approach is alternative implementation of the range-based approach, when it is desirable to hide the internal structure of the adapter resources from the accessing software that is unaware of the internal structure of adapter resources.

In this illustrative approach, the command structure is mapped to the adapter address space using the adapter configuration, I/O address space, or memory address space. Software, such as a hypervisor, OS, or application, writes the command to the command structure. The software may also read the response from the response structure. Access to the command structure may be detected by dedicated adapter logic, which in turn may respond to the commands and update the resource context fields respectively.

For example, it is particularly useful to employ the command-based approach in a hypervisor implementation. Since the hypervisor is responsible for the allocation of adapter resources only, it is not necessary that the hypervisor be aware of the internal structure of the resource context. Rather, the hypervisor just needs to know what types and how many resources are supported by the adapter. For instance, while performing resource allocation, instead of performing a direct update of the resource context (e.g., with LPAR_ID), the hypervisor may request that the adapter allocate a particular instance of the given resource type to the particular partition (e.g., QP #17 is allocated to partition #5). Consequently, the adapter does not need to look for the available QP, since the particular instance of QP is specified by the hypervisor, and the hypervisor is not required to be aware of the internal structure of the QP context.

In particular, this command-based approach is important in situations where the accessing software should not be aware of the internal structure of the adapter resource. For example, this illustrative approach may be used to implement the hypervisor-adapter interface. The command-based interface allows for abstracting the hypervisor code from the adapter internal structure and for using the same hypervisor code to perform resource allocation for different I/O adapters. If the hypervisor is responsible only for resource allocation and resource initialization and management is performed by the OS, a simple querying and allocation protocol may satisfy hypervisor needs. For example, the protocol may include querying the resource types supported by the adapter, the amount of each supported resource, and the command to allocate/deallocate/reassign a resource number of the specified resource to a particular partition number.

Figure 19:
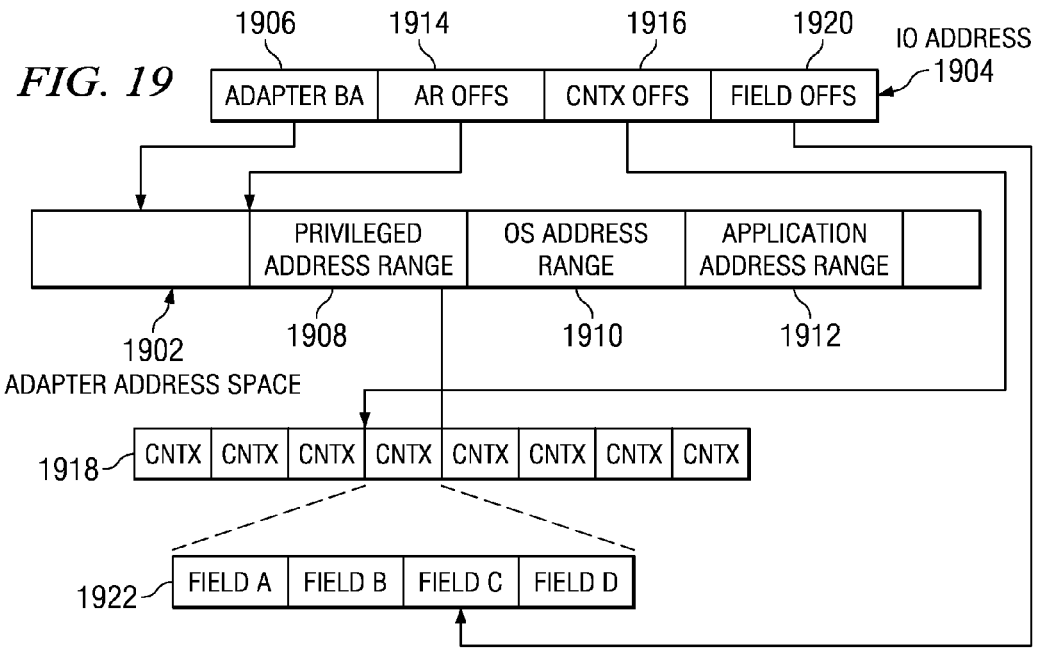
FIG. 19 is a diagram illustrating I/O address decoding in accordance with a preferred embodiment of the present invention.

Turning now to FIG. 19, a diagram illustrating I/O address decoding is depicted in accordance with a preferred embodiment of the present invention. As resource context mapping to adapter address space as described in FIGS. 18A and 18B is used to access the resource context fields, field attributes in the I/O address are used to validate the access to the resource context.

In particular, software may be used to perform a memory-mapped input-output (MMIO) write to adapter address space 1902. Decoding logic within the adapter uses various bits within I/O address 1904 to write to adapter address space 1902. For example, decoding logic within adapter 1904 may detect an access to adapter address space 1902 by matching adapter base address (BA) bits 1906 from I/O address 1904 and adapter address space 1902. The base address is the beginning of the I/O address space that belongs to the adapter. The base address is typically aligned to the size of the adapter address space to allow easy detection/decoding process.

The adapter decoding logic also finds the referred address range (e.g., privileged 1908, OS 1910, or application 1912) of adapter address space 1902 using AR offs bits 1914. AR offs is an offset of the particular address range inside the adapter address space. Cntx offs bits 1916 may be used to locate the resource context, such as resource context 1918. Cntx offs is a resource context offset inside the particular adapter address range. The adapter decoding logic also uses field offs bits 1920 as an offset to the field inside the resource context, such as field 1922. Field offs is an offset of the particular field in the adapter resource context. In this manner, the adapter may use the address range type and the field attributes to validate access to the resource context.

Figure 20:
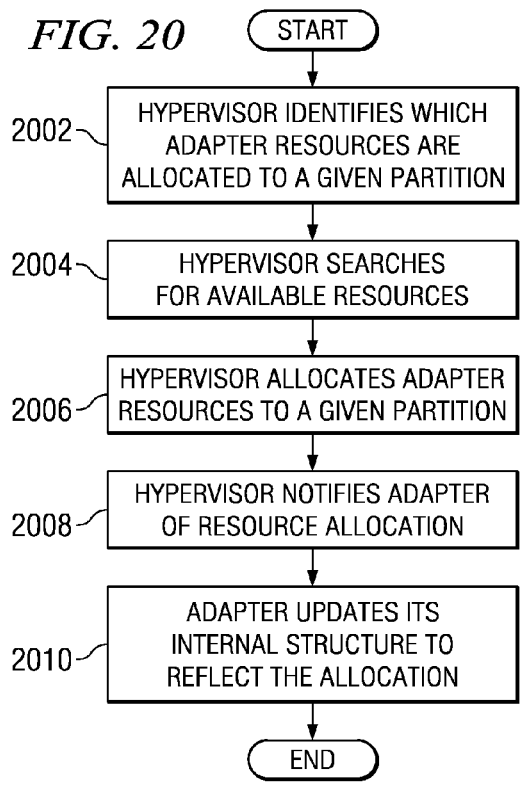
FIG. 20 is a flowchart of a process for implementing dynamic resource allocation of a virtualized I/O adapter in accordance with a preferred embodiment of the present invention.

FIG. 20 is a flowchart of a process for implementing dynamic resource allocation of a virtualized I/O adapter in accordance with a preferred embodiment of the present invention. The flowchart in FIG. 20 is employed to allocate the adapter resources. The process begins with the hypervisor identifying which adapter resources are allocated to a particular partition (step 2002). When the hypervisor wants to allocate a new resource to a given partition, the hypervisor searches for available (not allocated) resources (step 2004). For example, the hypervisor may search a bitmap for non-allocated resources. The hypervisor then allocates resources for the partition, such as marking them in the bitmap as allocated (step 2006). The hypervisor notifies the adapter (or updates the structure of the adapter) to reflect that those resources were allocated to the given partition (step 2008). Consequently, the adapter respectively updates its internal structure to reflect the allocation (step 2010). The process of deallocation or reassignment of adapter resources is similar to the allocation process described above.

Thus, the present invention provides a method, apparatus, and computer instructions for allowing multiple OS instances to directly share adapter resources. In particular, the present invention provides a mechanism for configuring multiple address spaces per adapter, where each address space is associated to particular access level of the partitioned server and the PCI adapter in conjunction with virtual memory manager (VMM) provides access isolation between the various OS instances sharing the PCI adapter.

The advantages of the present invention should be apparent in view of the detailed description provided above. Existing methods of using PCI adapters either do not allow for sharing of an adapter's resources or, alternatively, the adapter's resources are shared by going through an intermediary, such as a hosting partition, hypervisor, or special I/O processor. However, not sharing adapter resources requires more PCI I/O slots and adapters per physical server, and high performance PCI adapters may not be fully utilized by a single OS instance. Using an intermediary to facilitate PCI adapter sharing adds additional latency to every I/O operation. In contrast, the present invention not only reduces the amount of time and resources needed when using PCI adapters via sharing adapter resources among OS instances, but it also allows the adapter to enforce access control to the adapter resources.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a logical partitioned data processing system that includes a plurality of different logical partitions for dynamically sharing adapter resources among a plurality of operating system instances, wherein each one of the plurality of operating system instances is included in a different one of the plurality of different logical partitions, comprising:

locating, by a hypervisor, available resources in a peripheral computer interface input/output adapter, the available resources comprising resources that have not been allocated;

allocating, by the hypervisor, a first part of the available adapter resources in the adapter to a first one of the plurality of operating system instances;

allocating, by the hypervisor, a second part of the available adapter resources in the adapter to a second one of the plurality of operating system instances;

notifying the adapter, by the hypervisor, of the adapter resource allocation to the first one of the plurality of operating system instances;

updating, by the adapter, an internal structure of the adapter to reflect the allocation;

wherein a resource context of the internal structure of the adapter includes a plurality of fields, wherein each one of the plurality of fields defines a mapping of an address of the first part of the available adapter resources to a permitted accessing address range, and wherein each one of the plurality of fields includes an access permission attribute for the permitted accessing address range defined in the one of the plurality of fields;

wherein the access permission attribute identifies an allowed type of access;

wherein the resource context can only be accessed via an address space that has been allocated to the adapter, wherein the resource context is stored outside of the adapter; and wherein the adapter is accessed using the address space.

2. The method of claim 1, wherein the resource context is stored in system memory and is accessed via the address space.

3. The method of claim 1, wherein the hypervisor uses a privileged access address range when the hypervisor accesses the adapter resources, a particular operating system instance uses an operating system instance access address range when the particular operating system instance accesses the adapter resources, and a particular application uses an application access address range when the particular application accesses the adapter resources.

4. The method of claim 1, further comprising:
wherein the first operating system instance owns the first part of the adapter resources when the hypervisor allocates the first part of the available adapter resources in the adapter to the first operating system instance;
revoking the first operating system instance's ownership of the first part of the adapter resources; and
reallocating the first part of the adapter resources to a third operating system instance.

5. The method of claim 1, further comprising:
initializing the adapter resources, wherein a particular operating system instance is used to initialize the adapter resources.

6. The method of claim 5, wherein the particular operating system instance performs the initialization using an operating system non-privileged access address range.

7. The method of claim 1, wherein a privileged access address range included in the accessing address range corresponds to a hypervisor access level, an operating system instance non-privileged access address range included in the accessing address range corresponds to an operating system access level, and an application non-privileged range included in the accessing address range corresponds to an application access level.

8. The method of claim 1, wherein the logical partitioned data processing system performs the allocation using a privileged access address range.

9. The method of claim 1, wherein the access permission attribute identifies one of a read-only, a write-only, and a read-write permission.

10. The method of claim 1, further comprising:
using adapter address mapping to identify a protection level of accessing software.

11. The method of claim 1, further comprising:
implementing the mapping of the address of each available resource using PCI base registers of three PCI functions of the adapter, wherein:
a privileged access address range is defined using a first PCI function, an operating system instance access address range is defined using a second PCI function, and an application access address range is defined using a third PCI function; and
the hypervisor uses the privileged access address range when the hypervisor accesses the adapter resources, a particular operating system instance uses the operating system instance access address range when the particular operating system instance accesses the adapter resources, and a particular application uses the application access address range when the particular application accesses the adapter resources.

12. A logical partitioned data processing system that includes a plurality of different logical partitions for dynamically sharing adapter resources among a plurality of operating system instances, wherein each one of the plurality of operating system instances is included in a different one of the plurality of different logical partitions, comprising:
a hypervisor, wherein the hypervisor is used to track allocated adapter resources and perform adapter resource allocation; and
an adapter;
wherein the hypervisor locates available resources in a peripheral computer interface input/output adapter, the available resources comprising resources that have not been allocated, allocates a first part of the available adapter resources in the adapter to a first operating system instance, allocates a second part of the available adapter resources in the adapter to a second one of the plurality of operating system instance, and notifies the adapter of the adapter resource allocation to the first operating system instance;
wherein the adapter updates an internal structure of the adapter to reflect the allocation;
wherein a resource context of the internal structure includes a plurality of fields, wherein each one of the plurality of fields defines a mapping of an address of the first part of the available adapter resources to a permitted accessing address range, and wherein each one of the plurality of fields includes an access permission attribute for the permitted accessing address range defined in the one of the plurality of fields, and wherein the access permission attribute identifies an allowed type of access;
wherein the resource context can only be accessed via an address space that has been allocated to the adapter, wherein the resource context is stored outside of the adapter; and
wherein the adapter is accessed using the address space.

13. The data processing system of claim 12, wherein the resource context is stored in system memory and is accessed via the address space.

14. The data processing system of claim 12, wherein the first operating system owns the first part of the adapter resources when the hypervisor allocates the first part of the available adapter resources in the adapter to the first operating system instance, wherein the hypervisor revokes ownership of the allocated adapter resource; and wherein the hypervisor reallocates the first part of the adapter resources to a third operating system instance.

15. The data processing system of claim 12, wherein the hypervisor uses a privileged access address range when the hypervisor accesses the adapter resources, a particular operating system instance uses an operating system instance access address range when the particular operating system instance accesses the adapter resources, and a particular application uses an application access address range when the particular application accesses the adapter resources.

16. A computer program product, stored in a non-transitory computer readable medium, that includes a plurality of different logical partitions for dynamically sharing adapter resources among a plurality of operating system instances, wherein each one of the plurality of operating system instances is included in a different one of the plurality of different logical partitions, said computer program product comprising:
first instructions for locating, by a hypervisor, available resources in a peripheral computer interface input/output adapter, the available resources comprising resources that have not been allocated;
second instructions for allocating, by the hypervisor, a first part of the available adapter resources in the adapter to a first operating system instance;
third instructions for allocating, by the hypervisor, a second part of the available adapter resources in the adapter to a second one of the plurality of operating system instance;
fourth instructions for notifying the adapter, by the hypervisor, of the adapter resource allocation to the first operating system instance; and
fifth instructions for updating, by the adapter, an internal structure of the adapter to reflect the allocation;
wherein a resource context of the internal structure includes a plurality of fields, wherein each one of the plurality of fields defines a mapping of an address of the first part of the available adapter resources to a permitted accessing address range, and wherein each one of the plurality of fields includes an access permission attribute for the permitted accessing address range defined in the one of the plurality of fields, and wherein the access permission attribute identifies an allowed type of access;

wherein the resource context can only be accessed via an address space that has been allocated to the adapter, wherein the resource context is stored outside of the adapter; and wherein the adapter is accessed using the address space.

17. The computer program product of claim 16, wherein the resource context is stored in system memory and is accessed via the address space.

18. The computer program product of claim 16, further comprising:

wherein the first operating system instance owns the first part of the adapter resources when the hypervisor allocates the first part of the available adapter resources in the adapter to the first operating system instance;

sixth instructions for revoking the first operating system instance's ownership of the first part of the adapter resources; and seventh instructions for reallocating the first part of the adapter resources to a third operating system instance.

19. The computer program product of claim 16, further comprising:

sixth instructions for initializing the adapter resources, wherein an operating system instance is used to initialize the adapter resources.

20. The computer program product of claim 16, wherein the hypervisor uses a privileged access address range when the hypervisor accesses the adapter resources, a particular operating system instance uses an operating system instance access address range when the particular operating system instance accesses the adapter resources, and a particular application uses an application access address range when the particular application accesses the adapter resources.

* * * * *